United States Patent [19]
Kato et al.

[11] Patent Number: 5,792,432
[45] Date of Patent: Aug. 11, 1998

[54] CATALYST UNIT AND GAS PURIFYING APPARATUS

[75] Inventors: Yasuyoshi Kato; Tomihisa Ishikawa; Yoshinori Nagai; Isato Morita; Masato Mukai; Akihiro Yamada; Takashi Michimoto; Masaharu Morii, all of Kure; Hiroshi Kuroda, Tokyo, all of Japan

[73] Assignee: Babcock-Hitachi Kabushiki Kaisha, Japan

[21] Appl. No.: 648,139

[22] PCT Filed: May 14, 1995

[86] PCT No.: PCT/JP95/02323

§ 371 Date: May 21, 1996

§ 102(e) Date: May 21, 1996

[87] PCT Pub. No.: WO96/14920

PCT Pub. Date: May 23, 1996

[30] Foreign Application Priority Data

| Nov. 15, 1994 | [JP] | Japan | 6-280869 |
| Jan. 20, 1995 | [JP] | Japan | 7-007112 |
| Apr. 11, 1995 | [JP] | Japan | 7-085636 |
| Jul. 27, 1995 | [JP] | Japan | 7-191648 |
| Aug. 1, 1995 | [JP] | Japan | 7-196744 |

[51] Int. Cl.$^6$ ............................................. B01D 50/00
[52] U.S. Cl. ..................................... 422/171; 502/316
[58] Field of Search ........................... 422/171, 172, 422/177, 179; 502/316

[56] References Cited

U.S. PATENT DOCUMENTS 4,285,838  8/1981  Ishida et al. ............................. 502/316

FOREIGN PATENT DOCUMENTS

| 0433222 | 6/1991 | European Pat. Off. . |
| 8705723 | 6/1987 | Germany . |
| 8527885 | 2/1988 | Germany . |
| 4316132 | 11/1994 | Germany . |
| 50-128681 | 3/1974 | Japan . |
| 61-28377 | 6/1986 | Japan . |
| 2-68145 | 3/1990 | Japan . |

*Primary Examiner*—Scott Kastler
*Attorney, Agent, or Firm*—Lorusso & Loud

[57] ABSTRACT

A catalyst unit is constructed by alternately stacking rectangular catalyst elements (1) formed by cutting catalyst support plates coated with a catalytic material and having ribs (2) inclined at 45° to one specified side edge (1a) of each thereof, and those turned upside down in a case, and the catalyst unit is disposed in a gas passage with the ribs (2) of the catalyst elements (1) inclined at an angle greater than 0° and smaller than 90° to the direction of the gas flow (6). When the catalyst unit comprising the catalyst elements (1) coated with a denitrating catalyst is placed in the gas passage, the ribs (2) of the catalyst elements (1) blocks the gas flow (6) and generate turbulent currents on the downstream side thereof to promote the contact of ammonia and NOx contained in the exhaust gas with the catalyst. When the gas flow (6) is disturbed, the thickness of laminar films covering the surface of the catalyst elements (1) is reduced, so that ammonia and NOx can be easily diffused and the catalytic activity can be enhanced. The catalyst elements exhibits their catalytic abilities effectively without entailing significant pressure loss in the gas flow.

29 Claims, 27 Drawing Sheets

(a)   (c)

(b)   (d)

(a)

(b)

BENDING END PORTION

CATALYST UNIT AND GAS PURIFYING APPARATUS

TECHNICAL FIELD

The present invention relates to a catalyst unit for purifying a gas and more particularly, to a catalyst unit employing a plate-shaped catalyst elements for efficiently reducing nitrogen oxides (hereinafter referred to as "NOx") with ammonia ($NH_3$), and gas processing employing the catalyst unit.

BACKGROUND ART

The NOx contained in the exhausted gas discharged by power plants, plants, automobiles and such is a substance causative of photochemical smog and acid rain. An exhaust gas denitrating method that employs $NH_3$ as a reducing agent for selective catalytic reduction has been prevalently used as an effective denitrating method principally in thermal power plants. A titanium oxide ($TiO_2$) catalyst containing vanadium (V), molybdenum (Mo) or tungsten (W) as an active ingredient is used. Particularly, a catalyst containing vanadium (V) is highly active, difficult to be deteriorated by impurities contained in exhaust gases and effective even at low temperatures. Therefore, such a catalyst is the most currently prevalent denitrating catalyst (JP-A No. 50-128681).

Generally, catalyst elements are formed in the shape of a honeycomb or a plate. Various methods of manufacturing catalyst elements have been developed. A well-known flat catalytic plate is formed by coating and cladding a mesh base member formed by working a thin metal sheet in a metal lath and spraying aluminum over the metal lath, a textile fabric or a nonwoven fabric with a catalyst. This flat catalytic plate is worked to obtain a plate-shaped catalyst element 1 having ribs 2 of a wavelike cross section, and flat sections 3 in an alternate arrangement as shown in FIG. 2. A plurality of such catalyst elements 1 are stacked in layers in a case 4 with the ribs 2 extended in the same direction to construct a catalyst unit 8 (JP-A No. 54-79188 and JPO filing No. 63-324676) as shown in FIG. 43. Since this known catalyst unit 8 causes comparatively small pressure loss and cannot be easily clogged with soot and coal ashes, the catalyst unit 8 is employed prevalently in denitrating apparatuses for denitrating the exhaust gases of boilers for thermal power generation.

The number of power generating installations equipped with gas-turbines or combinations of gas-turbines and waste heat recovery boilers has progressively increased in recent years to cope with peak power demand in summer. Most of such power generating installations are located in the suburbs of cities, and exhaust gas processing apparatus must be highly efficient and compact in view of site condition and pollution control. Under such circumstances, a method of efficiently reducing the NOx content of exhaust gases proposed in JP-A No. 55-152552 employs a catalyst unit 8 constructed by stacking catalyst elements 1 as shown in FIG. 2 so that the respective ribs 2 of the adjacent catalyst elements 1 extend perpendicular to each other, and disposes the catalyst unit 8 with the ribs 2 of the alternate catalyst elements 1 extending perpendicular to the direction of gas flow 6 and with the ribs 2 of the rest of the catalyst elements 1 extending in parallel to the direction of gas flow 6 as shown in FIG. 44.

A catalyst unit 11 proposed in JP-$Y_2$ No. 52-6673 is formed by working metal laths or a metal sheets to obtain corrugated sheets 9 having successive ridges 10 of a wavelike cross section and not having any flat section as shown in FIG. 46, constructing a support structure by stacking the corrugated sheets 9 so that the respective ridges 10 of the adjacent corrugated sheets 9 extend across each other as shown in FIG. 47, and a catalyst is supported on the support structure to complete the catalyst unit 11. The catalyst unit 8 of FIG. 43 needs the following improvements to construct a high-efficiency, compact exhaust gas processing apparatus. FIG. 48 shows some of gas passages defined by the catalyst elements 1 stacked with the ribs 2 extended in parallel to the direction of gas flow 6. Catalyst units 8 of this type causing very small pressure loss, the exhaust gas processing apparatus employing the catalyst unit 8 of this type requires small power for operation. However, since the flows of gas in the gas passages of the catalyst unit 8 is not very turbulent and the distance of movement of the components of the gas in the gas passages is small, the catalytic reaction rate (overall reaction rate) is small and the catalyst is unable to fully exhibit its activity.

When the catalyst unit 8 is constructed by stacking the catalyst elements 1 so that the ribs 2 extend in parallel to the direction of gas flow 6 as shown in FIG. 43, the rigidity of the catalyst unit with respect to the direction in which the ribs 2 are extended (longitudinal direction) is very large, while the rigidity of the same with respect to the direction perpendicular to the longitudinal direction is small. Therefore there are slight differences in width between the gas passage in the longitudinal direction of the ribs 2 and that perpendicular thereto.

In the catalyst unit 8 shown in FIG. 44, in which the respective ribs 2 of the adjacent catalyst elements 1 are perpendicular to each other, the ribs 2 extending perpendicular to the direction of gas flow 6 exert high gas disturbing effect to promote the component substances of the gas to be subjected to a catalytic reaction. However, those ribs 2 work as barriers against the flow of the gas causing a large pressure loss.

A small degree of freedom of changing draft loss and performance is a problem in the catalyst unit 8 shown in FIG. 44. Since the catalyst unit 8 is constructed by alternately stacking catalyst elements 1 of the same shape, the opening ratio of the catalyst unit 8 does not change and hence draft loss does not decrease significantly even if the pitch of the ribs 2 (the distance between the adjacent ribs) is changed. Furthermore, since the length of the catalyst elements 1 must be equal to the size of the frontage of the catalyst unit 8, it is difficult to change the length of the catalyst elements 1 optionally. Naturally, two types of catalyst elements 1 of different shapes, e.g. those different in the pitch of the ribs 2, may be alternately stacked, but such two types of catalyst elements 1 requires complex manufacturing processes entailing increase in manufacturing costs.

In the catalyst unit 8 shown in FIG. 44, the pitch of the ribs 2 that affect significantly the effect of the catalyst on reaction rate and pressure loss is an important factor. Although the ribs 2 are arranged at equal pitches, the distance between the inlet end of the catalyst unit 8 and the first rib 2 and that between the last rib 2 and the outlet end of the catalyst unit 8 with respect to the direction of gas flow 6 are not particularly specified. Since the catalyst unit 8 shown in FIG. 44 is constructed by stacking the catalyst elements 1 of a given length obtained by cutting a continuous catalytic sheet provided with the ribs 2 at given pitches at given intervals, in some cases, the distance between the end of the catalyst unit 8 and the first rib 2 increases when the amount of the catalyst necessary for catalytic reaction increases, i.e., when the length of the catalyst elements 1 is
} increased. Consequently, the flat section bends and it is difficult to form a uniform flow passages and it is possible that the end section of the catalyst element bends as shown in FIG. 45 to block the gas passage, lowering the performance of the catalyst unit 8 due to increase in the draft resistance and unbalanced gas flows.

The corrugated catalyst elements 9 of the catalyst unit 11 shown in FIG. 47 do not have any sections corresponding to the flat sections 3 of the catalyst elements 1 shown in FIG. 2. Therefore, when the height of the ridges 10 is substantially equal to that of the ribs 2 of the catalyst elements 1 shown in FIGS. 43 and 44, the ridges 10 of the adjacent corrugated catalyst elements 9 are in contact at a very large number of contact points. Therefore, when the gas flow 6 flows across the section of the cubic catalyst unit 11, the numerous contact points of the ridges 10 cause draft resistance against the gas flow 6, increasing pressure loss.

Accordingly, it is a first object of the present invention to solve problems in the prior art and to provide a catalyst unit capable of enhancing the turbulence of a gas to be processed in the gas passages thereof to suppress the formation of laminar films and of further enhancing catalytic actions.

A second object of the present invention is to solve problems in the prior art and to provide a catalyst unit capable of causing a gas to be processed to diffuse satisfactorily over catalytic surfaces without increasing pressure loss and of enhancing the performance of the catalyst.

A third object of the present invention is to solve problems in the prior art and to achieve exhaust gas purification by using a catalyst unit capable of enhancing the performance of the catalyst by further leveling the flow velocity distribution of a gas to be processed without causing pressure loss in the gas flow.

DISCLOSURE OF THE INVENTION

Generally, reaction between a gas flow flowing through a pipe and a catalyst supported on the wall of the pipe is expressed by:

$$1/K = 1/Kr + 1/Kf$$

where K is overall catalytic reaction velocity constant, Kr is unit surface area reaction velocity constant, and Kf is film coefficient of mass transfer of a gas, which indicates the easiness of diffusion of a gas over catalytic surfaces.

As is obvious from the expression, the catalytic performance of a catalyst can be improved by increasing film coefficient of mass transfer of the gas.

The present invention is intended to solve a problem to enhance the performance of the catalyst by improving the diffusion of the gas over the surface of catalytic surfaces to the largest possible extent without increasing the pressure loss of the gas that flows through the catalyst unit.

The present invention will more readily be understood by reference to the accompanying drawings, however, these drawings are intended to illustrate the invention and are not to be construed to limit the scope of the invention.

First, a catalyst unit provided with catalyst elements of the present invention provided with ribs and arranged with the ribs at an angle greater than 0° and smaller than 90° to the direction of gas flow will be described.

A mode of stacking the component catalyst element provided with the aforesaid oblique ribs will be described.

FIGS. 6(a) to 6(d) show catalyst units constructed by stacking catalyst elements in accordance with the present invention with the ribs thereof inclined at an angle greater than 0° and smaller than 90°. In the catalyst unit shown in FIG. 6(a), rectangular catalyst elements 1 each provided with parallel ribs 2 formed at a given pitch between flat sections 3 so as to extend at an angle θ meeting an inequality, 0°<θ<90° to a specified side edge 1a of a flat rectangular plate catalyst element 1 are stacked with the alternate catalyst elements 1 facing up and the catalyst elements 1 between the former catalyst elements 1 facing down. In the catalyst unit shown in FIG. 6(b), rectangular catalyst elements 1 each provided with parallel ribs 2 formed at a given pitch between flat sections 3 so as to extend at an angle θ meeting an inequality, 0°<θ<90° to a specified side edge 1a of a flat rectangular plate, and rectangular catalyst elements 1' each provided with parallel ribs 2' formed at a given pitch between flat sections 3' so as to extend in parallel to the specified side edge 1a of the flat rectangular plate are stacked alternately, in which the catalyst elements 1' underlie the catalyst elements 1, which applies to the catalyst units shown in FIGS. 6(c) and 6(d).

In the catalyst unit shown in FIG. 6(c), rectangular catalyst elements 1 each provided with parallel ribs 2 formed at a given pitch between flat sections 3 so as to extend at an angle θ meeting an inequality, 0°<θ<90° to a specified side edge 1b of a flat rectangular plate, and rectangular catalyst elements 1' each provided with parallel ribs 2' formed at a given pitch between flat sections 3' so as to extend in parallel to the specified side edge 1b of the flat rectangular plate are stacked alternately. In the catalyst unit shown in FIG. 6(d), pairs of the rectangular catalyst elements 1 and 1' shown in FIG. 6(b) and pairs of catalyst elements 1 and 1' shown in FIG. 6(c) are stacked alternately.

The gas flow 6 flows into each of the catalyst units in accordance with the present invention formed by stacking the catalyst elements 1 and 1' as shown in FIGS. 6(a) to 6(d) in a direction perpendicular to one side edge 1c of a flat rectangular plate of the catalyst unit.

In the catalyst units in accordance with the present invention shown in FIGS. 6(a) to 6(d), the ridges of the ribs 2 of the two adjacent catalyst elements 1, and the ridges of the ribs 2 and 2' of the two adjacent catalyst elements 1 and 1' are in point contact with each other, and portions of the ribs 2 and 2' extending on the opposite sides of the points of contact are inclined at the given angle θ to the specified side edge 1a or 1b of a flat rectangular plate (=the catalyst element 1).

Since the ribs 2 and 2' are inclined to the direction of gas flow 6 and slit passages of a predetermined width are formed in gas passages defined by the flat sections 3 and 3' of the catalyst elements 1 and 1' and the ribs 2 and 2' of the corresponding adjacent catalyst elements 1 and 1', the degree of blocking the gas is small though, a certain pressure loss is caused. Consequently, the unbalanced flow velocity of the gas flowing through the slit passages and in the neighborhood of the ribs 2 and 2' is leveled off.

Furthermore, as shown in FIG. 7, turbulent flows are generated on the downstream side of the ribs of the catalyst unit of the type shown in FIG. 6(a) to promote the contact between, for example, NOx and NH₃ contained in the exhaust gas, and the catalyst.

The disturbance of the gas flow 6 reduces the thickness of the laminar films formed over the catalytic surfaces, which facilitates the diffusion of NOx and NH₃ and improves catalytic activity greatly. The gas flow 6 disturbed by the portions of the ribs 2 or the ribs 2 and 2' in point contact with each other flows through the slit passages for a predetermined distance. The degree of turbulence of the gas flow 6 is decreased as the gas flows through the slit passages. Therefore, the pressure loss is not extremely large, the thickness of the laminar films on the catalytic surfaces is reduced, and hence the gas diffuses satisfactorily to increase the catalytic performance greatly.

Since the gas to be processed flows into the catalyst units constructed by stacking the catalyst elements 1 and 1' as shown in FIGS. 6(a) to 6(d) in a direction oblique to the ribs 2 and 2', the flow passage area of the gas passages is not reduced sharply and reduced gradually and continuously or stepwise, as compared with the reduction of the flow passage area in the catalyst unit shown in FIG. 50 (plan view of the catalyst unit shown in FIG. 44) or FIG. 47, so that pressure loss is comparatively small.

In the prior art catalyst unit (JP-A No. 55-152552) shown in FIG. 50, slit passages are formed between the catalyst element 1 having the ribs 2 parallel to the gas flow 6, and the catalyst element 1' having the ribs 2' perpendicular to the gas flow 6 (FIG. 51 showing a cross section taken on line A—A in FIG. 50). Since the ribs 2' perpendicular to the gas flow 6 are arranged at predetermined intervals, the gas flow 6 is blocked by the ribs 2' in the catalyst unit, so that the pressure loss is very large as compared with that which is caused by the catalyst units shown in FIG. 6.

In the prior art catalyst unit 11 (JP-U No. 52-6673) shown in FIG. 47, the catalyst elements do not have any sections corresponding to the flat sections 3 and 3' shown in FIG. 6 or 50, and the ridges 10 are in point contact with each other at positions far many than positions of contact between the ribs 2 and 2' of the catalyst unit shown in FIG. 6 or 50. Therefore, when the height of the ridges 10, i.e., the depth of the furrows, is the same as that of the ribs shown in FIG. 6 or 50, the gas is disturbed by the portions of the ridges 10 in point contact with each other in the catalyst unit 11 and a pressure loss far greater than that is caused by the catalyst units shown in FIG. 6 results.

In the catalyst unit in accordance with the present invention shown in FIG. 6, the ribs 2 of each catalyst element are inclined to the specified side edge 1a or 1b (side edges 1a and 1b are parallel to the direction of the gas flow 6) of the catalyst element 1 at the angle θ greater than 0° and smaller than 90°. When the angle θ is determined so that the opposite ends of the longest rib 2a of each catalyst element 1 are in contact with side walls 12a and 12b at positions near the inlet and the outlet end of the gas passage, respectively, as shown in FIG. 14, the gas flow 6 that flows through a flat passage (the slit passages) defined by the flat section 3a adjacent to the longest rib 2a must inevitably flow over the longest rib 2a toward the outlet end, whereby the degree of contact of the gas with the catalyst is increased accordingly.

On the other hand, when the angle θ is determined so that the opposite ends of the longest rib 2a of each catalyst element 1 are on the inlet and the outlet end of the gas passage, respectively, as shown in FIG. 15, the gas flow 6 that flows into the slit passage defined by the flat section 3a adjacent to the longest rib 2a need not flow over the longest rib 2a and is able to flow through the slit passage toward the outlet end. In this case, the degree of contact of the gas with the catalyst is smaller than that in the case illustrated in FIG. 14.

In the prior art catalyst unit shown in FIG. 43, the ribs 2 of all the catalyst elements 1 are parallel to the direction of flow 6. Therefore, each catalyst element 1 has a large bending strength with respect to a direction parallel to the direction of the gas flow 6 and a small bending strength with respect to a direction perpendicular to the direction of gas flow 6. Therefore, the catalyst elements bend easily and the width of the spaces between the catalyst elements 1 is irregular as shown in FIG. 49.

In the catalyst unit in accordance with the present invention, in which the ribs 2 of the alternate catalyst elements 1 are inclined at an angle greater than 0° and smaller than 90° to the direction of the gas flow 6, the rigidity with respect to a direction perpendicular to the direction of the gas flow 6 is increased and the catalyst elements 1 do not bend. Accordingly, the flow passage area rarely varies irregularly and gas passages having regularly varying flow passage area can be formed. The gas passages of regularly varying flow passage area, in combination with the gas mixing effect of the ribs 2 and 2', reduce greatly the probability of formation of regions in which the rate of catalytic reaction is low.

Thus, the present invention has not only the effect of preventing the reduction of catalytic performance attributable to the irregular variation of the flow passage area of the gas passages but also the effect of reducing the probability of forming gas passages having irregularly varying sectional area. Although the ribs 2 and 2' disturb the gas flow 6 to promote the contact between components of catalytic reaction and the catalytic surfaces and enhance the activity, the pressure loss caused by the catalyst elements 1 and 1' is smaller than that caused by the catalyst elements stacked with the ribs 2 and 2' extending in a direction perpendicular to the direction of gas flow 6, because the catalyst elements 1 and 1' are arranged alternately with the ribs 2 and 2' extending at an angle greater than 0° and smaller than 90° to the direction of the gas flow 6.

The ribs of the plate-shaped catalyst elements in accordance with the present invention may be of any shape, provided that the ribs and the flat sections are arranged alternately in parallel to each other. The ribs may be formed in any one of cross sections of an S-curved shape, a zigzag shape and a convex relief shape as shown in FIGS. 3(a) to 3(e) by way of example.

Although there is no any particular restriction on the height of the ribs from the surface of the flat sections, a desirable height of the ribs of the catalyst elements to be used for denitration is in the range of 1.5 to 14 mm. Excessively little height increases pressure loss and excessively big height increases the volume of the catalyst necessary for securing the same performance. The width of the flat sections is dependent on the bending strength of the catalyst element; a greater width is more advantageous provided that the catalyst element does not bend, because a greater width is more effective in reducing pressure loss. A desirable width is in the range of 5 to twenty-five times the height of the ribs from the surface of the flat section. Ordinarily, the width of the flat sections of catalyst element to be used for denitration is in the range of about 10 to about 150 mm.

A catalyst unit in accordance with the present invention employing catalyst elements formed by working perforated base plates will be described hereinafter.

An example employing a metal lath as a perforated base plate will be explained. A catalyst element having a metal lath carrying a catalyst so that the meshes thereof corresponding to the holes of a perforated plate are through openings is fabricated by working, for example, a thin metal sheet to obtain a metal lath having meshes arranged at pitches in the range of 1 to 5 mm, and directly coating the metal lath or coating the same after roughening the surface by metallizing using aluminum or the like with a slurry containing a catalyst so that the meshes are not stopped up with the slurry, or by entirely coating the metal lath with a slurry containing a catalyst and blowing compressed air against the metal lath entirely coated with the slurry to open the meshes stopped with the slurry.

All the meshes of the catalyst element may be open, or some may be open and others may be closed. The following catalyst elements have particularly excellent catalytic properties. (1) A catalyst element having flat sections coated with the catalyst so that the meshes are stopped with the catalyst, and ribs of, for example, a cross section among those shown in FIG. 3 extending in a fixed direction and having meshes not stopped with the catalyst. (2) A catalyst element having flat sections coated with a catalyst so that the meshes thereof are not stopped up with the catalyst, and ribs of the aforesaid shape having meshes stopped up with the catalyst. (3) A catalyst element having flat sections and ribs having meshes stopped up with a catalyst.

The catalyst element of (3) is used in combination with the catalyst elements of (1) and (2).

FIGS. 16 to 20 show typically a gas flow 6 in spaces between catalyst elements 1 forming catalyst units and formed by processing, for example, metal laths in accordance with the present invention. FIGS. 16 to 19 show typically the catalyst units constructed by stacking the catalyst elements 1 so that the ribs 2 of each catalyst element 1 and those of the catalyst element 1 underlying the former catalyst element extend perpendicular to each other. In FIG. 16, all the meshes of the catalyst supporting metal laths of the catalyst elements 1 are open; in FIG. 17, only the meshes in portions of the catalyst supporting metal laths forming the ribs 2 of the catalyst elements 1 are open; in FIG. 18, only the meshes in portions of the catalyst supporting metal laths forming the flat sections 3 are open; in FIG. 19, the catalyst elements 1 with all the meshes of the metal laths stopped up and the catalyst elements 1' with all the meshes of the metal laths open are stacked alternately.

FIG. 20 shows part of a catalyst unit in accordance with the present invention as viewed obliquely from above the catalyst unit. This catalyst unit is constructed by stacking a plurality of catalyst elements 1 having open meshes 4 only in the ribs 2 so that the ridges of the ribs 2 of the two adjacent catalyst elements 1 intersect each other to form a gas passage between the adjacent catalyst elements 1 so that part of the gas is blocked continuously or stepwise with respect to the direction of the gas flow 6. FIG. 20 shows a gas flow 6 in a catalyst unit constructed by stacking the catalyst elements alternately so that the ribs 2 are inclined at an angle greater than 0° and smaller than 90° to the direction of the gas flow 6.

As shown in FIGS. 16 to 20, as the resistance of the ribs 2 extending perpendicular to the direction of the gas flow 6 or the ribs 2 extending at an angle to the direction of the gas flow 6 against the gas flow 6 increases, the gas flows through the open meshes 4 (FIG. 20) from one into another passage adjacent to the former separated by the catalyst element 1 from the latter. Consequently, the gas flow 6 is stirred (disturbed) to enhance catalytic activity. Pressure loss caused by the ribs 2 will be reduced by the gas flows through the meshes of the catalyst elements 1, so that draft loss of the catalyst unit is small. Since the ribs 2 of the catalyst elements 1 shown in FIG. 20 are inclined at an angle greater than 0° and smaller than 90° to the direction of gas flow 6 and hence the gas that flows into the catalyst unit impinges obliquely on the ribs 2, the flow passage area of the gas passages is not reduced sharply and reduced gradually and continuously or stepwise, as compared with the reduction of the flow passage area in the catalyst units shown in FIGS. 16 to 19, so that gas flow is not blocked excessively by the ribs 2. Consequently, pressure loss can be further reduced with stirring effect sufficient for improving the activity maintained.

The catalyst unit in accordance with the present invention employing such perforated plate has an excellent gas mixing and stirring effect in enhancing and promoting catalytic performance, and an excellent effect in reducing draft loss.

A catalyst unit in accordance with the present invention having the catalyst elements formed by processing the perforated plates and stacked so that the ribs thereof are inclined at an angle greater than 0° and smaller than 90° may be formed in any one of the constructions shown in FIGS. 6(a) to 6(d).

The catalyst element in accordance with the present invention formed by processing the perforated plate can be applied to constructing a catalyst unit 8 having catalyst elements 1' having ribs 2' of a lesser height, and catalyst elements 1 having ribs 2 of a bigger height stacked in an alternate arrangement as shown in FIG. 21, and to constructing a catalyst unit 8 having catalyst elements 1 having two types of ribs 2 and 2' of different heights and stacked so that the ridges of the respective ribs 2 and 2' of the adjacent catalyst elements 1 are perpendicular to each other as shown in FIG. 27. A catalyst unit, not shown, may be constructed by alternately stacking catalyst elements 1 having two types of ribs 2 and 2' of different heights, and catalyst elements 1 having ribs 2 of the same height.

The present invention includes a catalyst unit 8 as shown in FIG. 21 constructed by alternately stacking catalyst elements 1 and 1' respectively having ribs 2 of bigger height and ribs 2' of lesser height so that the edges of the ribs 2 and 2' intersect perpendicular to each other (FIG. 21) or at an angle greater than 0° and smaller than 90°.

In the catalyst unit 8 shown in FIG. 44, in which the ridges of the respective ribs 2 of the adjacent catalyst elements 1 are perpendicular to each other, the ribs 2 have the same height and the ribs 2 must be arranged at comparatively large pitches to limit the draft resistance of the catalyst unit 8 to a small value; that is, the number of the ribs 2 of the catalyst unit 8 must be small to limit the draft resistance to a small value and, consequently, the gas cannot be disturbed satisfactorily.

The draft resistance of the catalyst unit 8 is due to a loss in the kinetic energy of the gas flow caused by a turbulent flow caused by contracting and expanding passages formed by the ribs 2. Since the loss in the kinetic energy is greatly dependent on the occlusive property of the gas passage section (opening ratio of the passage), the greater the opening ratio, i.e., the lower the ribs 2, the smaller the draft resistance. Therefore, it is effective in reducing the draft resistance to form the ribs 2 of the catalyst element 1 disposed with the ridges of the ribs 2 extended perpendicular to the direction of the gas flow 6 in a lesser height to increase the opening ratio of the passage of the exhaust gas.

The inventors of the present invention made the following study of the effect of the disturbance of the gas flow in promoting mass transfer. In a catalyst unit constructed by stacking catalyst elements having ribs arranged at fixed intervals so that the ridges of the respective ribs of the adjacent catalyst elements are perpendicular to each other, the flow passage area of a passage between the two adjacent catalyst elements respectively having ribs of different heights was varied to examine the relation between the catalytic performance and the draft resistance. The results of the study are shown in FIG. 23.

Experiments were conducted by using a catalyst unit constructed by stacking two types of catalyst elements 1 and 1' respectively having ribs 2 and 2' of different heights as shown in FIG. 22 so that the ridges of the ribs 2 and 2' extend perpendicular to each other. The ribs 2 of the catalyst element 1 have a height $h_1$ from the surface of the flat section 3 and are arranged at a pitch $P_1$. The catalyst element 1' have a height $h_2$ from the surface of the flat section 3' and are arranged at a pitch $P_2$.

Comparison was made of a catalyst unit constructed by alternately stacking catalyst elements 1 having ribs 2 of height $h_1=6$ mm and catalyst elements 1' having ribs 2' of height $h_2=4$ mm so that the ribs 2 of the catalyst elements 1 are perpendicular to the direction of the gas flow and the ribs 2' of the catalyst elements 1' are parallel to the direction of the gas flow were compared, and a catalyst unit constructed by alternately stacking catalyst elements 1 having ribs 2 and catalyst elements 1' having ribs 2' of height $h_2=4$ mm so that the ribs 2 of the ridges of the catalyst elements 1 are parallel to the direction of the gas flow and the ribs 2' of the catalyst elements 1' are perpendicular to the direction of the gas flow. The results of comparison are shown in FIG. 23.

As is obvious from FIG. 23, the catalyst unit constructed by alternately stacking catalyst elements 1 having ribs 2 of height $h_1=6$ mm and catalyst elements 1' having ribs 2' of height $h_2=4$ mm so that the ribs 2 of the catalyst elements 1 are perpendicular to the direction of the gas flow and the ribs 2' of the catalyst elements 1' are parallel to the direction of the gas flow were compared, and the catalyst unit constructed by alternately stacking catalyst elements 1 having ribs 2 of height $h_1=6$ mm and catalyst elements 1' having ribs 2' of height $h_2=4$ mm so that the ribs 2 of the ridges of the catalyst elements 1 are parallel to the direction of the gas flow and the ribs 2' of the catalyst elements 1' are perpendicular to the direction of the gas flow are substantially the same in denitration ability, and the draft resistance of the catalyst unit having the ribs 2' of height $h_2=4$ mm extended perpendicular to the direction of the gas flow is as small as about 60% of that of the catalyst unit having the ribs 2 of height $h_1=6$ mm.

Similarly, a catalyst unit having, in combination, catalyst elements 1' having ribs 2' of height $h_3=3$ mm and extended perpendicular to the direction of the gas flow, and catalyst elements 1 having ribs 2 of height $h_1=7$ mm has a further reduced draft resistance. It is known that the reduction of the draft resistance have a small effect on the reduction of the mass transfer rate.

Therefore, a catalyst unit having ribs, which promote turbulence, of a big height is not necessarily preferable; ribs of a lesser height are desirable in view of reducing draft resistance, provided that the ribs are able to disturb the gas effectively (able to reduce the thickness of the laminar films formed on the catalytic surfaces).

In the prior art catalyst unit shown in FIG. 44, the interval between the ribs 2 (the width of the flat sections 3) must be reduced to secure a satisfactory ability when the height of the ribs 2 is reduced. The reduction of the interval between the ribs increases the number of the ribs 2 beyond a necessary number and augments the draft resistance.

Accordingly, the present invention includes a catalyst unit constructed by alternately stacking catalyst elements having, in an alternate arrangement, a plurality of linear ribs and a plurality of flat sections parallel to the ribs, in which, as shown in FIGS. 22(a) and 22(b), the two types of catalyst elements 1 and 1' respectively having the ribs 2 and 2' of different heights are stacked alternately with the ribs 2 and 2' extended perpendicular to each other.

Although there is no particular restriction on the heights of the ribs of the two types of catalyst elements, the heights, as shown in FIGS. 22(a) and 22(b), of the ribs of catalyst units intended for use for denitration are in the following ranges.

Height $h_1$ (Higher ribs 2):

3 to 14 mm, more preferably, 3 to 10 mm

The ridges of the ribs 2 are parallel to the direction of the gas flow.

Height $h_2$ (Lower ribs 2'):

2 to 6 mm

The ridges of the ribs 2' are perpendicular to the direction of the gas flow.

If the height $h_2$ of the ribs 2' is excessively large as compared with the height $h_1$ of the ribs 2, the draft resistance of the catalyst unit is as large as that of the prior art catalyst unit 8 shown in FIG. 44. If the height $h_2$ of the ribs 2' is excessively little as compared with the height $h_1$ of the ribs 2, the gas disturbing effect of the ribs 2' of the catalyst elements 1' is unsatisfactory though the draft resistance is small, and the catalytic volume needs to be increased to secure the same ability.

Accordingly, when the catalyst elements 1 and 1' having the ribs 2 and 2' of different heights are used in combination for constructing a catalyst unit, it is desirable that the ratio of the height of the higher ribs 2 to that of the height of the lower ribs 2' is in the range of 3/2 to 7/3.

Although it is advantageous in reducing draft resistance to form the ribs 2' of the catalyst elements 1' disposed with the ridges of the ribs 2' perpendicular to the direction of the gas flow at a smaller pitch $P_2$, ordinarily, the pitch $P_2$ in the range of about 30 to about 200 mm brings about satisfactory mass transfer promoting effect.

There is no particular restriction on the pitch $P_1$ of the ribs 2 of the catalyst element 1 disposed with the ridges of the higher ribs 2 in parallel to the direction of the gas flow. The ribs 2 may be arranged at any suitable pitch $P_1$ provided that the catalyst elements 1 have a suitable strength and the catalyst unit is able to secure gas passages.

In the catalyst unit shown in FIG. 21, the catalyst elements 1 having higher ribs 2 may be disposed with the ridges of the ribs 2 in parallel to the direction of the gas flow 6, and the catalyst elements 1' having lower ribs 2' may be disposed with the ridges of the ribs 2' inclined to the direction of the gas flow 6 at an angle greater than 0° and smaller than 90°, for example, in the range of 30° to an angle below 90°, more preferably, in the range of 40° to an angle below 80°. Such arrangement of the catalyst elements 1 and 1' is able to disturb the gas flow 6 without entailing significant increase in draft resistance. The gas flow 6 cannot be satisfactorily disturbed if the angle of inclination of the ridges of the ribs 2' of the catalyst elements 1' to the direction of the gas flow 6 is excessively small.

A catalyst element having two types of ribs of different heights or two types of catalyst elements respectively having ribs of different heights may be formed by processing perforated plates from which the catalyst elements shown in FIGS. 16 to 20 are fabricated.

The present invention includes a catalyst unit formed by stacking a plurality of catalyst elements 1 each having, in an alternate arrangement, rib sets each of a higher rib 2 and a lower rib 2', and flat sections 3 as shown in FIG. 26 so that the ridges of the respective ribs 2 and 2' of the adjacent catalyst elements 1 extended perpendicular to each other. A catalyst unit as shown in FIG. 27 may be constructed by alternately stacking catalyst elements 1 having two types of ribs 2 and 2' of different heights, and catalyst elements 1 having ribs of the same height so that the ridges of the ribs of the catalyst elements 1 and those of the ribs of the catalyst elements 1' extended perpendicular to each other.

The ribs 2 and 2' of the catalyst element 1 in accordance with the present invention may be of any shape provided that the sets of ribs 2 and 2', and the flat sections 3 are formed alternately and in parallel to each other. For example, the ribs 2 and 2' may be of a shape having any one of cross sections shown in FIGS. 28(a) to 28(e).

Although there is no particular restriction on the heights of the two types of ribs 2 and 2' having some of the shapes shown in FIG. 29 of the catalyst element 1, the heights of the ribs 2 and 2' of catalyst units intended for use for denitration are in the following ranges.

Height $h_1$ (Higher ribs 2):

3 to 14 mm, more preferably, 3 to 10 mm

The ridges of the ribs 2 are parallel to the direction of the gas flow.

Height $h_2$ (Lower ribs 2'):

2 to 6 mm

If the height $h_2$ of the lower ribs 2' is excessively large as compared with the height $h_1$ of the higher ribs 2, the draft resistance of the catalyst unit increases. If the height $h_2$ of the lower ribs 2' is excessively little as compared with the height $h_1$ of the higher ribs 2, the gas disturbing effect of the lower ribs 2' is unsatisfactory though the draft resistance is small, and the catalytic volume needs to be increased to secure the same ability.

Although it is advantageous in reducing draft resistance to form the higher ribs 2 at a larger pitch $P_1$, ordinarily, the pitch $P_1$ in the range of about 70 to about 250 mm brings about satisfactory mass transfer promoting effect.

In the catalyst unit 8 shown in FIG. 44, in which the ridges of the respective ribs 2 of the adjacent catalyst elements 1 are perpendicular to each other, the ribs 2 have the same height and the ribs 2 must be arranged at comparatively large pitches to limit the draft resistance of the catalyst unit 8 to a small value; that is, the number of the ribs 2 of the catalyst unit 8 shown in FIG. 44 must be small to limit the draft resistance to a small value and, consequently, the gas cannot be disturbed satisfactorily.

Since the loss in the energy of the gas flow due to a turbulent flow caused by the contraction and expansion of the passage by the ribs 2 of the catalyst unit 8 is greatly dependent on the occlusive property of the gas passage section (opening ratio of the passage), the greater the opening ratio, i.e., the lower the ribs 2, the smaller the draft resistance as mentioned above. Therefore, it is effective to use the catalyst unit 8 shown in FIG. 27 constructed by alternately stacking the catalyst elements 1 each having the two types of ribs 2 and 2' of different heights shown in FIG. 26 in reducing the draft resistance. FIG. 30 shows typically the mode of flow of the gas flow 6 in a passage defined by the catalyst elements 1 each having the two types of ribs 2 and 2' of different heights.

It is known from the results shown in FIG. 23 of the study of the mass transfer promoting effect of the turbulence of the gas made by the inventors of the present invention that a catalyst unit having ribs, i.e., turbulence promoting means, of a comparatively big height is not necessarily preferable and that ribs of a comparatively low height are desirable for reducing the draft resistance, provided that the thickness of laminar films formed on the catalytic surfaces can be reduced. These facts hold true also for the case in which a catalyst unit employing the catalyst elements 1 shown in FIG. 26.

For example, although the catalyst elements 1 are disposed with the ridges of the ribs 2 and 2' thereof extended perpendicular to the direction of the gas flow 6 in the catalyst unit shown in FIG. 27, the catalyst elements 1 may be disposed with the ridges of the ribs 2 and 2' thereof inclined at an angle greater than 0° and smaller than 90°, for example, an angle in the range of 30° to an angle below 90°, more preferably, in the range of 40° to an angle below 80°, to the direction of the gas flow 6. Such disposition of the catalyst elements 1 is able to disturb the gas flow 6 without entailing significant increase in the draft resistance.

The present invention includes a catalyst unit constructed by stacking catalyst elements 1 having a cross section as shown in FIG. 32 and two types of ribs 2 and 2' of different heights having a sectional shape shown in, for example FIG. 3 so that the ridges of the respective ribs 2 and 2' of the adjacent catalyst elements 1 perpendicular to each other, and the two types of ribs 2 and 2' of different heights of the alternate catalyst elements 1 are extended perpendicular to the direction of the gas flow 6 (FIG. 27), in which the distances $L_1$ and $L_2$ from the opposite ends, with respect to the direction of the gas flow 6, of the catalyst element 1 disposed with its ribs 2 and 2' extended perpendicular to the direction of the gas flow 6 to the first ribs 2a from the opposite ends of the same catalyst element 1, respectively, are eight times the interval T (FIG. 27) between the adjacent catalyst elements 1 or below.

When the interval T between the adjacent catalyst elements 1 is 6 mm, the distances $L_1$ and $L_2$ from the opposite ends of the catalyst element 1 to the first ribs 2a from the opposite ends, respectively, are 50 mm or below, desirably, in the range of 5 to 30 mm, and the pitch $L_3$ between the ribs of the catalyst element is 60 mm.

The catalyst unit may be constructed by stacking catalyst elements 1 as shown in FIG. 31 each having ribs 2 arranged at a given pitch $L_3$ determined by equally dividing the distance $[L-(L_1+L_2)]$ between the first ribs 2a from the opposite ends, respectively, of the catalyst element 1 (L is the distance of the opposite ends) so that the pitch $L_3$ is ten to twenty-three times the interval T (FIG. 27) between the catalyst elements 1.

When the distances $L_1$ and $L_2$ from the inlet end and the outlet end, with respect to the direction of gas flow, of the catalyst unit to the first ribs 2a from the inlet end and the outlet end, respectively, are thus determined, the edge portions of the catalyst element 1 do not bend as shown in FIG. 45 and predetermined gas passages can be secured in the inlet and the outlet end of the catalyst unit 8.

When the plurality of ribs 2 are arranged at equal intervals at the pitch $L_3$ that causes a low pressure loss between the first ribs 2a respectively from the opposite ends of the catalyst element 1, increase in draft resistance can be suppressed.

Thus, the pressure loss can be reduced and the reduction of the catalytic ability can be prevented in the catalyst unit constructed by stacking the plate-shaped catalyst elements 1 with the ridges of the ribs 2 and 2' of the adjacent catalyst elements 1 extended perpendicular to each other.

The foregoing catalyst elements are used in suitable combinations to construct catalyst units in accordance with the present invention.

The catalyst unit of the present invention can be applied to various catalytic reaction apparatuses for processing gases, such as catalytic deodorizing apparatuses, catalytic combustors and fuel reformers. The use of the catalyst unit of the present invention in exhaust gas denitrating apparatuses for denitrating an exhaust gas by reducing the NOx contained in the exhaust gas under the existence of an ammonia is the most typical application of the present invention. For example, a denitrating apparatus (FIG. 12) provided with at least one catalyst unit of the present invention comprising catalyst elements coated with a denitration catalyst in the passage of a NOx-containing exhaust gas is able to denitrate the exhaust gas at a high NOx removal efficiency entailing a comparatively low pressure loss in the exhaust gas.

The pressure loss can be limited to a value within a range allowed by a system, such as a plant, in which a denitrating apparatus is used by using a catalyst unit of the present invention comprising the aforesaid catalyst elements coated with a denitration catalyst in combination as shown in FIG. 13 with an ordinary low-pressure-loss denitrating apparatus having catalyst elements disposed with its ribs extended in parallel to the direction of the gas flow (a honeycomb denitrating apparatus having a structure having a honeycomb-shaped cross section or a plate type denitrating apparatus as shown in FIG. 43 having a structure constructed by stacking a plurality of flat plates at intervals).

Since some system, such as a plant, places restrictions in pressure loss on the catalyst unit and a pressure loss that may be caused when only the catalyst unit of the present invention is used is excessively high in some cases, the pressure loss can be limited to a value in the allowable range by using the catalyst unit of the present invention in combination with an ordinary catalyst unit that causes a low pressure loss.

The catalyst element of the present invention has a high effect in mixing the gas in the catalyst unit. Therefore, the irregularity of, for example, the ammonia concentration at the outlet of a catalytic denitrating apparatus is less irregular than that at the outlet of a catalytic denitrating apparatus that causes a less pressure loss even if the ammonia concentration at the inlet of the catalytic denitrating apparatus is locally irregular, so that a catalytic apparatus disposed on the downstream side of the catalytic denitrating apparatus is able to operate effectively.

BEST MODE FOR CARRYING OUT THE INVENTION

Preferred embodiments of the present invention will be described in detail hereinafter.

First, catalyst units embodying the present invention comprising catalyst elements disposed with its ribs inclined at an angle greater than 0° and smaller than 90° to the direction of a gas flow will be described.

EXAMPLE 1

A paste of about 36% in moisture content was prepared by kneading a mixture of 67 kg of a metatitanic acid slurry (30% by wt. $TiO_2$, 8% by wt. $SO_4$), 2.4 kg of ammonium paramolybdate $((NH_4)_6.Mo_7O_{24}.4H_2O)$, and 1.28 kg of ammonium metavanadate $(NH_4VO_3)$ and evaporating water contained therein by a heated kneader. The paste was extruded in 3 mm diameter round cords, pellets obtained by pelletizing the cords were dried by a fluidized bed drier, and then the dried pellets were baked at 250° C. for 24 hr in the atmosphere to obtain granules. The granules were crushed by a hammer mill to reduce in size to obtain a powder of 5 μm in average grain size as a first component. The composition of the first component was V/Mo/T=4/5/91 in atomic ratio.

Figure 2:
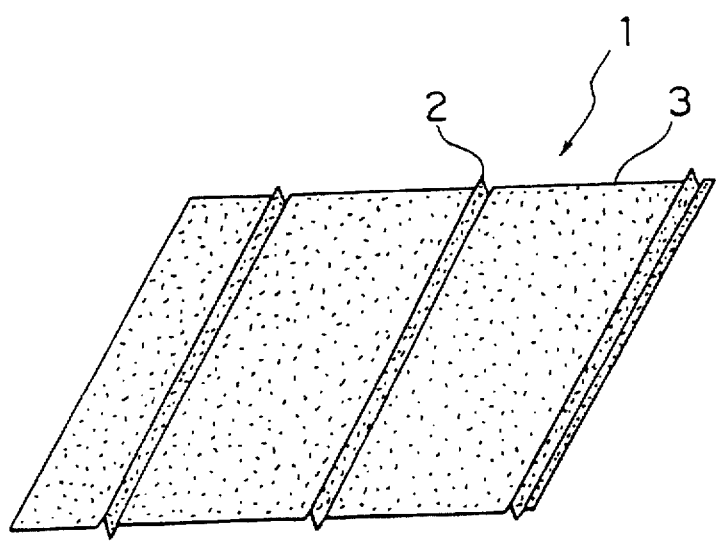
FIG. 2 is a perspective view of a catalyst element in an embodiment according to the present invention.
Figure 3:
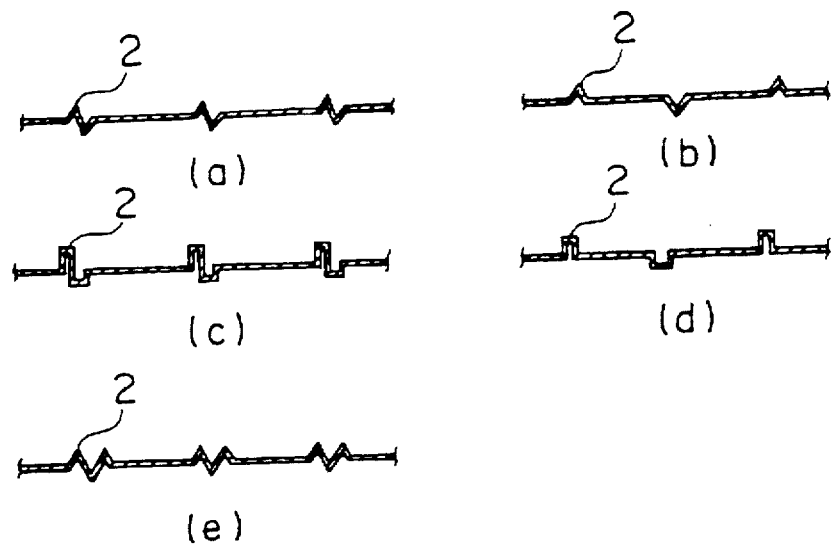
FIGS. 3(a), 3(b), 3(c), 3(d) and 3(e) are sectional view of catalyst elements having ribs and employed in the present invention.
Figure 4:
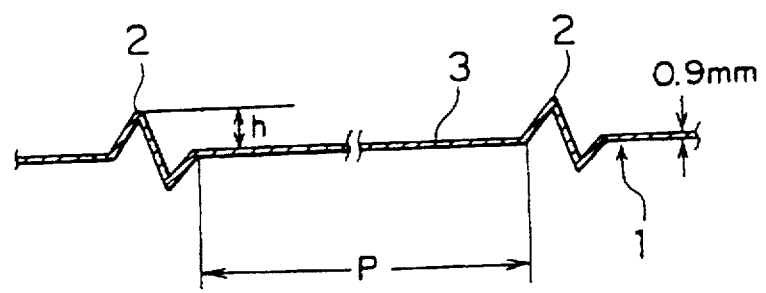
FIG. 4 is a sectional view of a catalyst element employed in an embodiment of the present invention.

A mixture of 20 kg of the power thus obtained, 3 kg of inorganic $Al_2O_3.SiO_2$ fibers and 10 kg of water was kneaded by a kneader for 1 hr to obtain a claylike catalytic paste. Flat catalytic plates of about 0.9 mm in thickness and 500 mm in length were fabricated by coating portions forming meshes of 500 mm wide, 0.2 mm thick metal laths of SUS 304 surface-treated for roughening by aluminum spraying with the catalytic paste. The flat catalytic plates were worked by pressing to obtain catalyst elements having ribs 2 of a wavelike cross section arranged at given pitches between flat sections 3 as shown in FIG. 2, and then the thus worked catalytic plates were baked at 550° C. for 2 hr in the atmosphere after air drying to obtain catalyst elements 1. In the catalyst elements 1 as shown in FIG. 4, the height h of the ribs 2 from the surface of the flat section 3 is 2.5 mm and the width P of the flat sections 3 is 80 mm.

Figure 5:
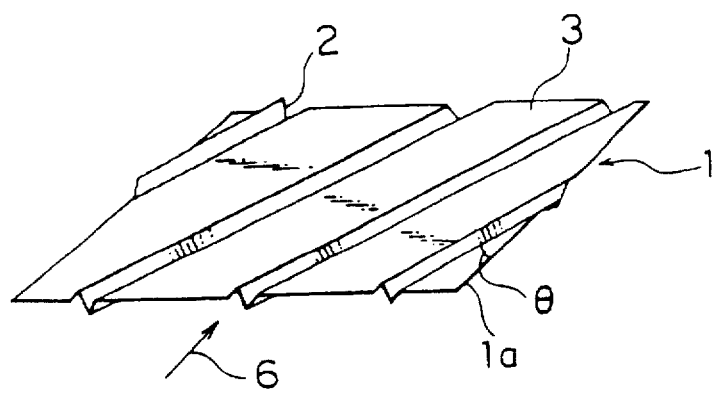
FIG. 5 is a perspective view of a catalyst element in an embodiment according to the present invention.
Figure 6:
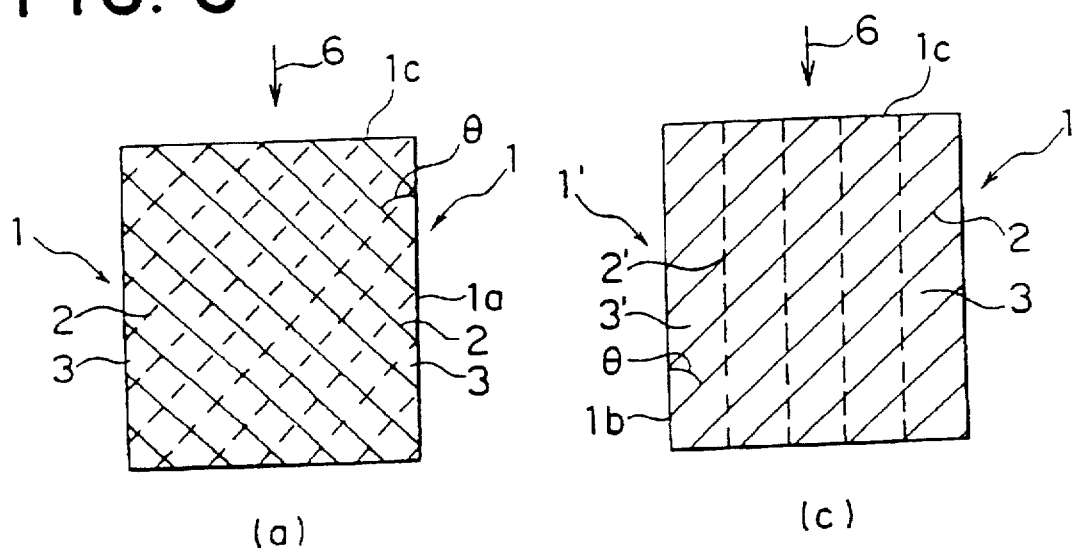
FIGS. 6(a), 6(b), 6(c) and 6(d) are schematic plan view for assistance in explaining modes of stacking catalyst elements employed in an embodiment according to the present invention.
Figure 6:
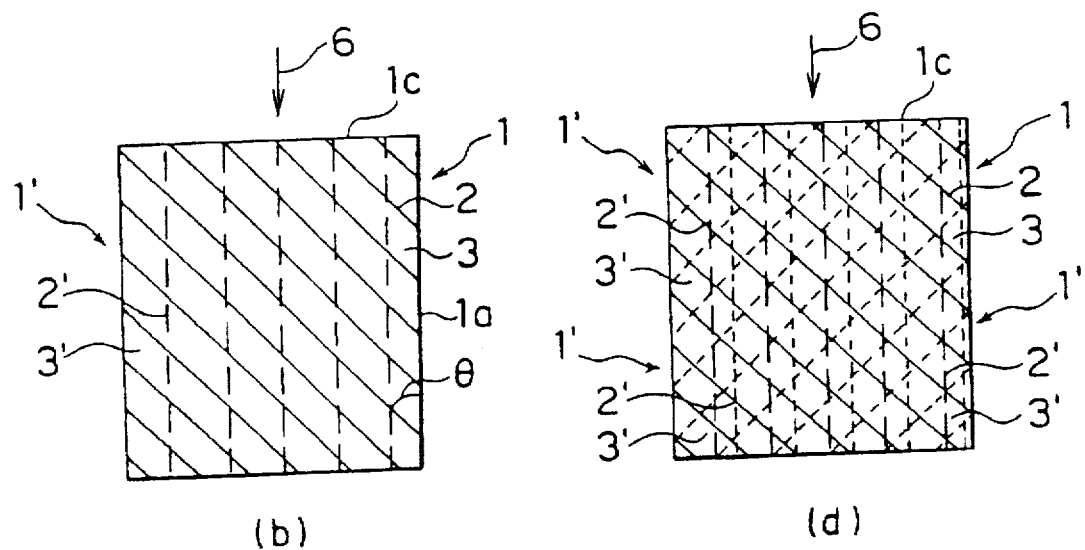

The catalyst elements 1 thus fabricated were cut in a rectangular shape so that the ribs 2 are inclined at 45° to one side edge 1a of each catalyst element 1 to complete rectangular catalyst elements 1 shown in FIG. 5. The catalyst elements 1 and those turned upside down were stacked alternately as shown in FIG. 1 in a case having 2 mm thick walls, not shown, to construct a layer-built catalyst unit of 150 mm by 150 mm by 500 mm (length) shown in FIG. 6(a).

Figure 1:
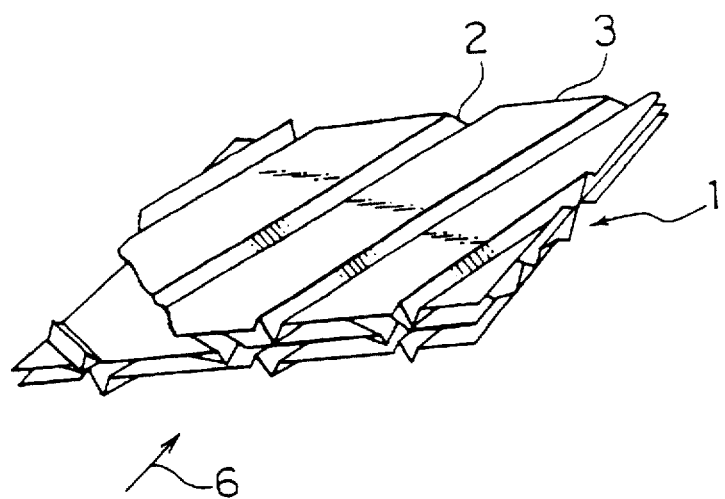
FIG. 1 is a fragmentary perspective view of a catalyst unit in an embodiment according to the present invention.

This catalyst unit is disposed in a gas passage so that the ribs 2 of the catalyst elements 1 are inclined at 45° to the direction of the gas flow 6 as shown in FIG. 1. Since the catalyst elements 1 are of the same shape and the catalyst unit can be constructed simply by alternately stacking the catalyst elements 1 and those turned upside down, the catalyst unit can be mass-produced at reduced manufacturing costs.

EXAMPLE 2

Figure 8:
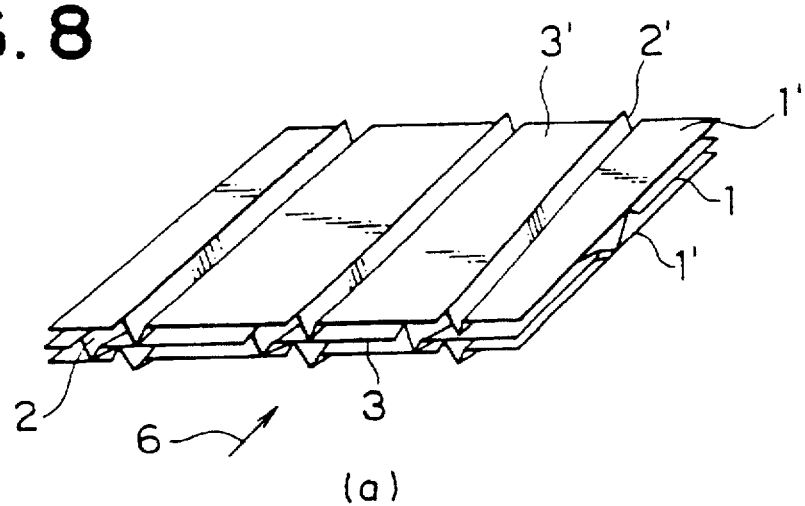
FIGS. 8(a) and 8(b) are fragmentary perspective views of a catalyst unit in an embodiment according to the present invention.
Figure 8:
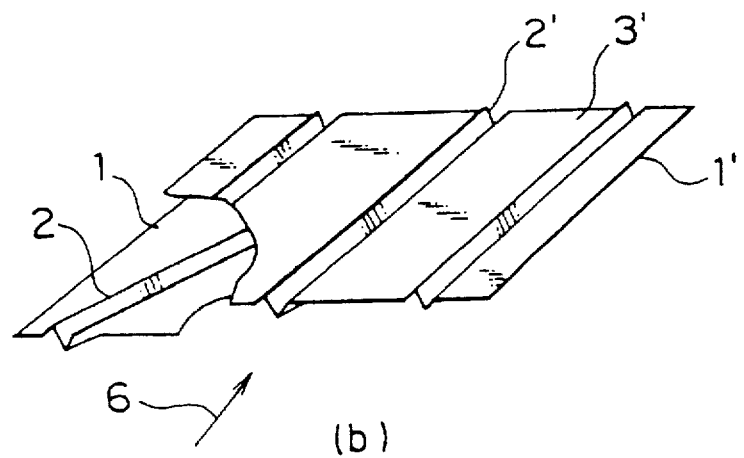

A catalyst unit of a construction shown in FIG. 6(b) or 6(c) (FIG. 8(a) or 8(b)) was constructed by alternately stacking catalyst elements 1 (the catalyst elements of Example 1 cut in a rectangular shape so that the ribs 2 are inclined at 45° to the side edge 1a) and catalyst elements 1' (the catalyst elements cut in a rectangular shape so that all the ribs 2 are parallel to a specified side edge 1a). The catalyst unit is disposed in a gas passage with the ribs 2 of the catalyst elements 1 inclined at 45° to the direction of the gas flow 6.

EXAMPLE 3

Figure 9:
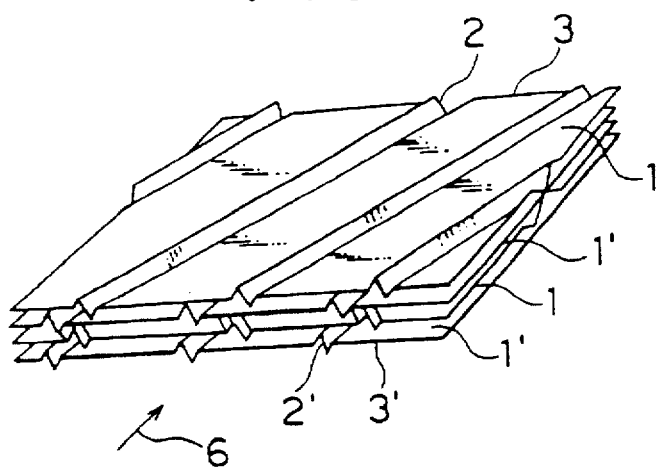
FIG. 9 is a fragmentary perspective view of a catalyst unit in an embodiment according to the present invention.

Catalytic plate sets each formed by superposing the catalyst element 1 and the catalyst element 1' employed in Example 2 as shown in FIG. 6(b), and catalytic plate sets each formed by superposing the catalyst element 1 and 1' as shown in FIG. 6(c) were stacked alternately as shown in FIG. 6(d) to obtain a catalyst unit shown in FIG. 9. The catalyst unit is disposed in a gas passage with the ribs 2 of the catalyst elements 1 thereof inclined at 45° to the direction of the gas flow 6.

Comparative Example 1

Figure 43:
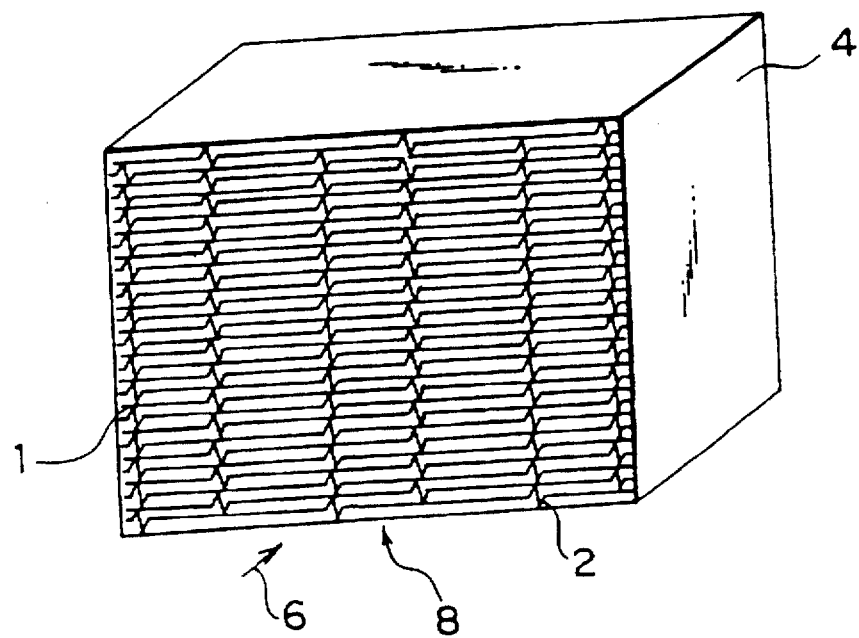
FIG. 43 is a side perspective view of a prior art catalyst unit.

Catalyst elements 1 as shown in FIG. 2 having ribs 2 of 5 mm in height from the surface of flat sections 3 were fabricated by working the flat catalytic plates from which the catalyst elements 1 of Example 1 were formed, and then the catalyst elements 1 thus fabricated were cut in a rectangular shape so that the ribs 2 are parallel to one specified side edge 1a of each catalyst element 1 to complete rectangular catalyst elements 1. The catalyst elements 1 were stacked in a case 4 as shown in FIG. 43 to construct a catalyst unit 8 of 150 mm by 150 mm by 500 mm (depth). The catalyst unit 8 is disposed in an exhaust gas passage with the ribs 2 of the catalyst elements 1 extended in parallel to the direction of the gas flow 6.

Each of the catalyst units in Examples 1 to 3 and Comparative example 1 was installed in a reactor forming the exhaust gas passage, and an LPG combustion exhaust gas was passed through the reactor to measure the denitrating abilities of the catalyst units in Examples 1 to 3 and Comparative example 1 under conditions tabulated in Table 1. The distribution of NOx concentration at the exhaust gas outlet ends of the catalyst units was measured and the uniformity of the exhaust gas flow was examined. Measured results are shown in Table 2.

TABLE 1

| Reaction temp. | 350° C. |
|---|---|
| Areal velocity | 60 m/h |
| Exhaust gas | LPG combustion exhaust gas |
| NO | 90 ppm |
| $NH_3$ | 108 ppm |

TABLE 2

| Catalytic units | NOx conc. at outlet (ppm) | | Mean denitration eff. (%) |
|---|---|---|---|
| | Mean | Standard dev. | |
| Ex. 1 | 10.5 | 2.3 | 89 |
| Ex. 2 | 15.3 | 3.1 | 83 |
| Ex. 3 | 14.4 | 3.0 | 84 |
| Comp. Ex. 1 | 31.5 | 9.9 | 65 |

Figure 7:
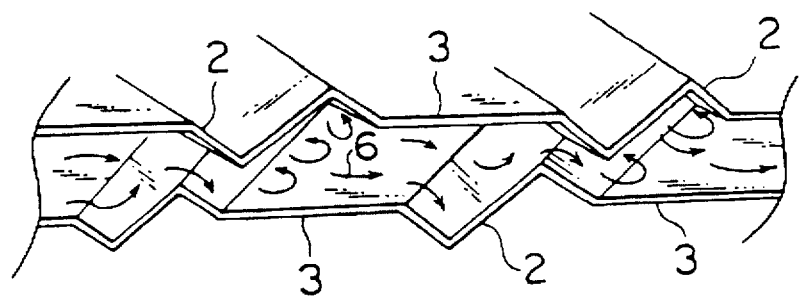
FIG. 7 is a typical view illustrating gas flow in a catalyst unit for assistance in explaining the effect of the present invention.

As is obvious from Table 2, the ranges of distribution of NOx concentration at the exhaust gas outlets of the catalyst units in Examples 1, 2 and 3 are very narrow and the flow of the exhaust gas in the catalyst units in Examples 1, 2 and 3 is uniform over the respective entire cross sections of the catalyst units in Examples 1, 2 and 3. The mean denitration efficiencies of the catalyst units of Examples 1, 2 and 3 are far higher than that of Comparative example 1. The blocking effect of the ribs 2 of the catalyst elements shown in FIG. 7 in addition to the uniform passage shape gives the catalyst units in Examples 1 (FIG. 2), 2 and 3 high denitrating abilities.

EXAMPLE 4

Catalyst elements 1 the same as those employed in Example 1 were cut in a rectangular shape so that the ribs 2 are inclined at 30° to a specified side edge 1a to obtain rectangular catalyst elements 1 shown in FIG. 5. The catalyst elements 1 and those turned upside down were stacked alternately as shown in FIG. 1 in a case having 2 mm thick walls, not shown, to construct a layer-built catalyst unit of 150 mm by 150 mm by 500 mm (length) shown in FIG. 6(a).

As shown in FIG. 1, this catalyst unit is disposed in an exhaust gas passage with the ribs 2 of the catalyst elements 1 inclined at 30° to the direction of the gas flow 6.

EXAMPLE 5

Catalyst elements 1 of a shape shown in FIG. 4 fabricated by the same processes as those for fabricating the catalyst elements 1 employed in Example 1, the catalyst elements 1 were cut to obtain rectangular catalyst elements 1 having ribs 2 inclined at an angle θ of 60° to one side edge 1a as shown in FIG. 5. The catalyst elements 1 and those turned upside down were stacked alternately as shown in FIG. 1 in a case having 2 mm thick walls, not shown, to construct a layer-built catalyst unit of 150 mm by 150 mm by 500 mm (length) shown in FIG. 6(a).

As shown in FIG. 1, the catalyst unit is disposed in an exhaust gas passage with the ribs 2 of the catalyst elements 1 inclined at 60° to the direction of the gas flow 6.

Comparative Example 2

Figure 44:
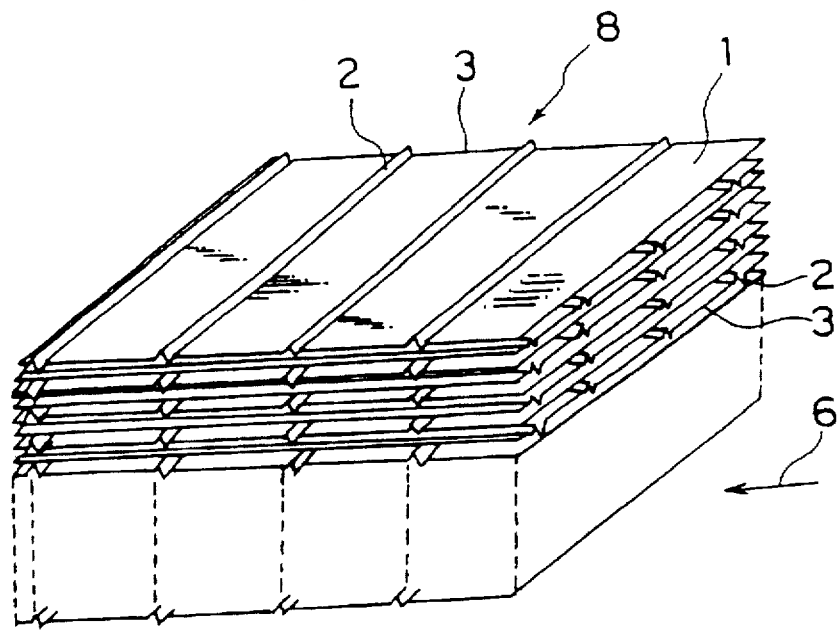
FIG. 44 is a perspective view of a prior art catalyst unit.
Figure 45:
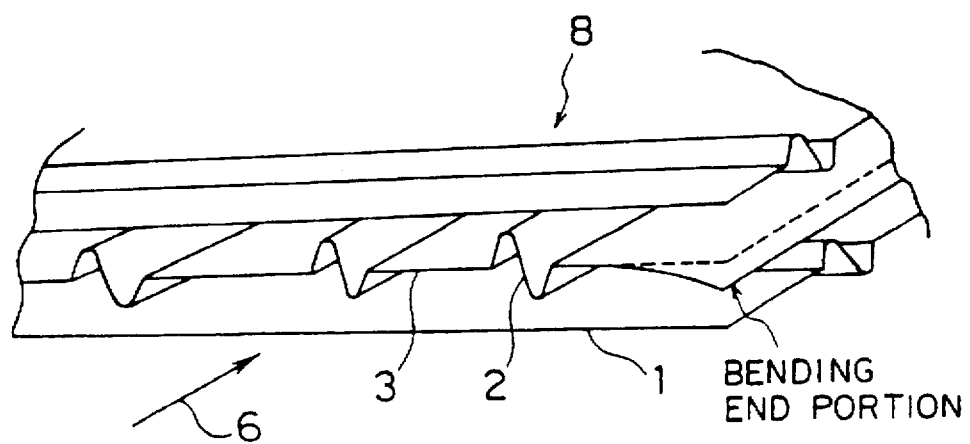
FIG. 45 is a view for assistance in explaining problems in the catalyst unit of FIG. 44.
Figure 46:
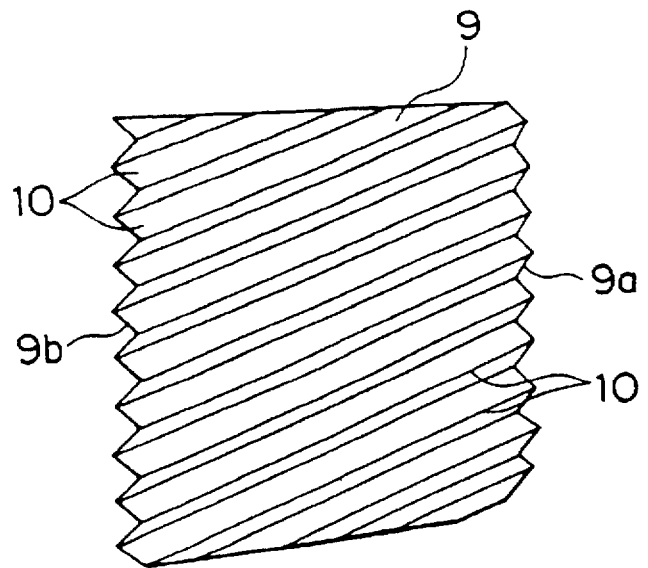
FIG. 46 is a plan view of a prior art catalyst element.

The catalyst elements 1 (FIG. 2) from which the rectangular catalyst elements 1 employed in Example 1 were stacked so that the respective ribs of the adjacent catalyst elements 1 extend perpendicular to each other as shown in FIG. 44 to obtain a catalyst unit. The catalyst unit was disposed with the ribs 2 of the alternate catalyst elements 1 were parallel to the direction of the gas flow 6.

Figure 10:
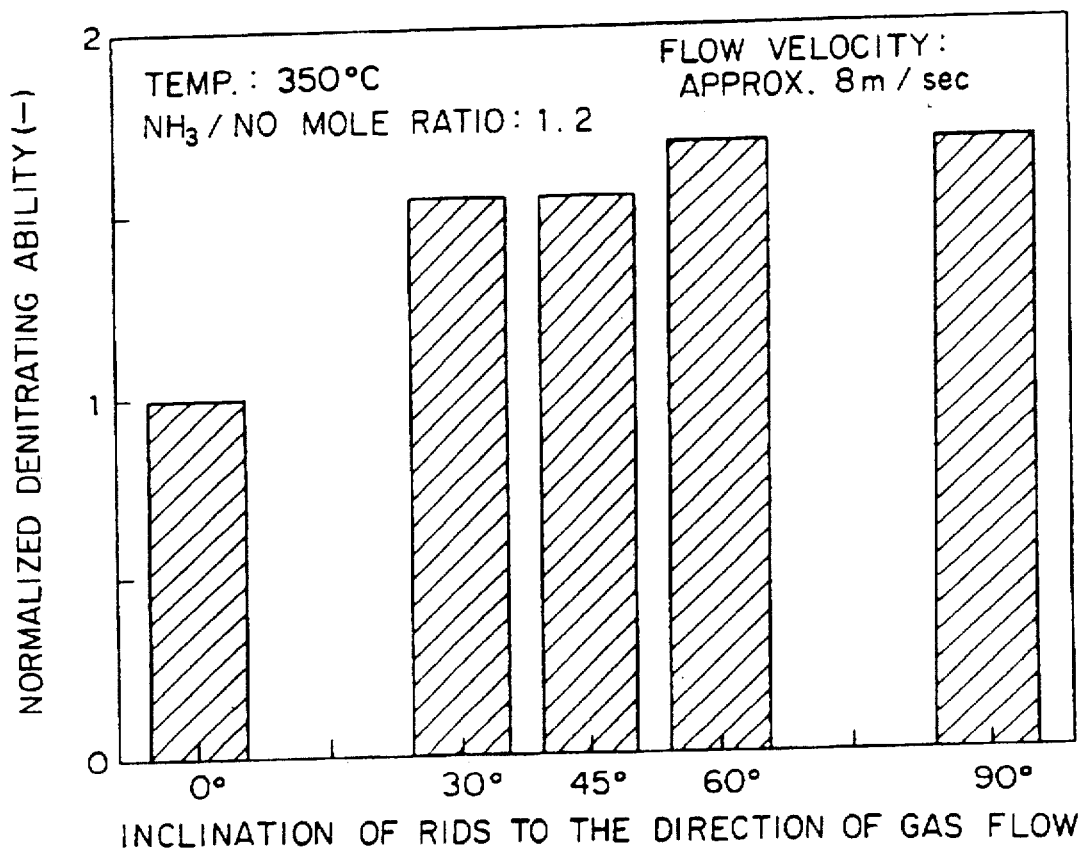
FIG. 10 is a diagram showing the denitrating ability of Example 1 of the present invention normalized by the denitrating ability of Comparative example 1.
Figure 11:
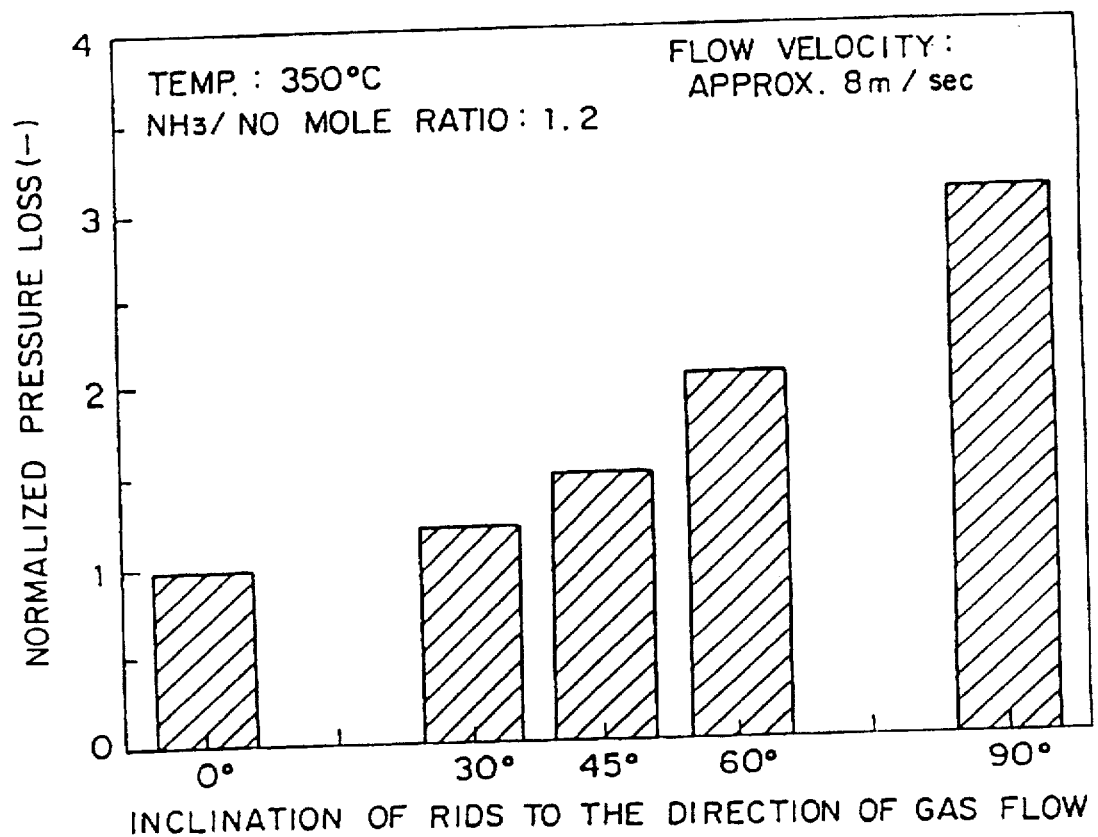
FIG. 11 is a diagram showing pressure loss caused by Example 1 of the present invention normalized by pressure loss caused by Comparative example 1.

Each of the catalyst units in Examples, 1, 4 and 5 and Comparative example 2 was installed in a reactor and an LPG combustion exhaust gas was passed through the reactor to measure the denitrating abilities of the catalyst units in Examples 1, 4 and 5 and Comparative example 2, and pressure losses caused by the same catalyst units under conditions tabulated in Table 1. FIG. 10 shows the denitrating abilities normalized by the denitrating ability of Comparative example 1, and FIG. 11 show pressure losses normalized by the pressure loss caused by Comparative example 1. Denitrating ability testing conditions were temperature: 350° C., $NH_3/NO$ mole ratio: 1.2 and gas flow velocity: 8 m/sec.

As is obvious from FIGS. 10 and 11, although Comparative example 2 had a high denitrating ability, the same caused a large pressure loss. The pressure losses caused by Examples 1, 4 and 5 were scarcely different from the pressure loss caused by Comparative example 1 in which the ribs were extended in parallel to the direction of the gas flow. Although slightly lower than the denitrating ability of Comparative example 2, the denitrating abilities of Examples 1, 4 and 5 were satisfactorily high.

As is obvious from FIGS. 10 and 11, when the angle of inclination of the ribs of the catalyst elements to the direction of the gas flow is greater than 30° and smaller than 60°, the catalyst units are able to effectively exert their denitrating abilities without significantly causing pressure loss (=ΔP) in the gas flow.

EXAMPLE 6

Figure 12:
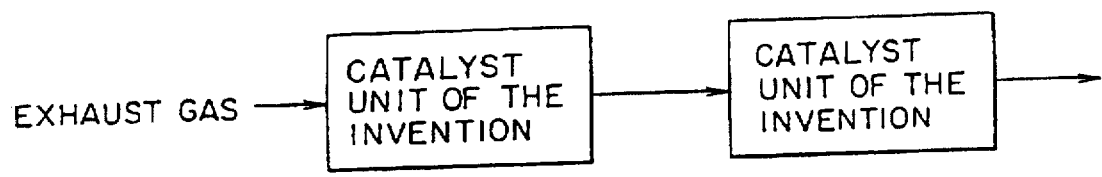
FIG. 12 is a block diagram of an exhaust gas purifying apparatus comprising two catalyst units in an embodiment according to the present invention successively arranged on an exhaust gas passage.

Two catalyst units of 150 mm by 150 m by 250 mm (depth) constructed by stacking catalyst elements coated with a denitrating catalyst and the same as those employed in Example 1, except that the length (depth) was 250 mm, were arranged in series along the direction of the gas flow as shown in FIG. 12, and a gas was passed through the catalyst units under the conditions tabulated in Table 1 to measure pressure loss and denitrating efficiency.

EXAMPLE 7

Figure 13:
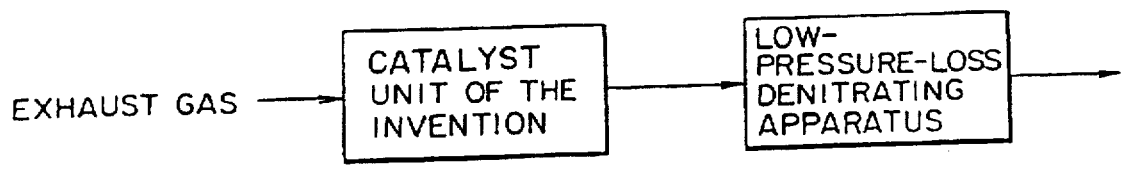
FIG. 13 is a block diagram of an exhaust gas purifying apparatus comprising a catalyst unit in an embodiment according to the present invention, and a denitrating apparatus that causes a low pressure loss disposed on the downstream side of the catalyst unit, arranged on an exhaust gas passage.
Figure 14:
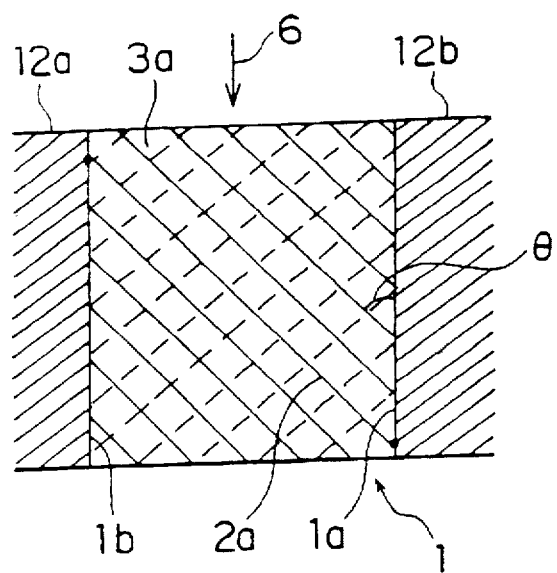
FIG. 14 is a schematic plan view of a catalyst unit in an embodiment according to the present invention disposed on a gas passage.
Figure 15:
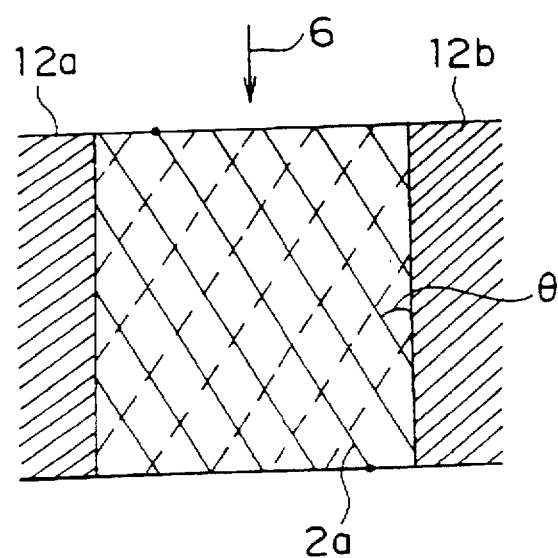
FIG. 15 is a schematic plan view of a catalyst unit in an embodiment according to the present invention.

A catalyst units of 150 mm by 150 m by 250 mm (depth) constructed by stacking catalyst elements coated with a denitrating catalytic paste and the same as those employed in Example 1, except that the length (depth) was 250 mm, and a denitrating apparatus (150 mm by 150 mm by 150 mm) that causes a small pressure loss, employing the plate type catalyst unit shown in FIG. 43 were arranged in series in an exhaust gas passage through which an exhaust gas containing nitrogen oxides flows along the direction of the gas flow as shown in FIG. 13. The catalyst elements 1 of the plate type catalyst unit were coated with the denitrating catalytic paste employed in Example 1. The catalyst unit was disposed on the upstream side of the denitrating apparatus. A gas was passed through the catalyst unit and the denitrating apparatus under the conditions tabulated in Table 1 to measure pressure loss and denitrating efficiency.

Comparative Example 3

Figure 42:
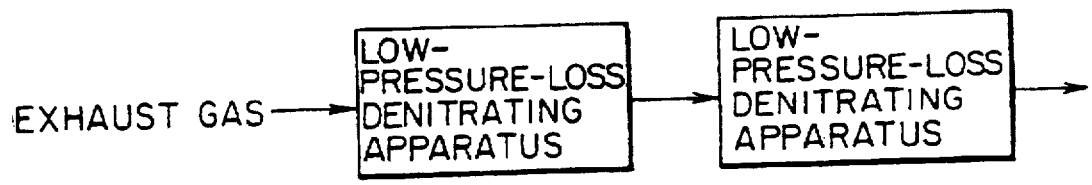
FIG. 42 is a block diagram of an exhaust gas purifying apparatus comprising two low-pressure-loss catalytic denitrating apparatus in accordance with the present invention.

Two catalyst units that cause a comparatively small pressure loss like the catalyst unit employed in Example 7 were arranged in series along the direction of the gas flow as shown in FIG. 42. A gas was passed through the catalyst units under the conditions tabulated in Table 1 to measure pressure loss and denitrating efficiency.

The denitrating abilities of the catalyst units in Examples 6 and 7 and Comparative example 3 and pressure losses caused by the same catalyst units were measured by passing an LPG combustion gas through the catalyst units under the conditions tabulated in Table 1. Measured results are shown in Table 3.

TABLE 3

| Catalyst units | Denitrating eff. (%) | Pressure loss (mmH$_2$O) |
| --- | --- | --- |
| Ex. 6 | 89 | 14 |
| Ex. 7 | 81 | 11 |
| Comp. Ex. 3 | 65 | 9 |

As is obvious from Table 3, although Comparative example 3, i.e., a catalytic apparatus employing the catalyst units that cause lesser pressure loss, causes a comparatively small pressure loss, the denitrating efficiency of Comparative example 3 is low, although the denitrating efficiency of Example 6, i.e., a catalytic apparatus employing the catalyst units of the present invention, is very high. Example 6 causes a pressure loss larger than that caused by Comparative example 3, and although the denitrating efficiency of Example 7, i.e. a catalytic apparatus employing the catalyst unit of the present invention and a catalyst unit that cause a comparatively low pressure loss disposed on the downstream side of the former catalyst unit, is lower than that of Example 6, Example 7 causes a pressure loss lower than that caused by Example 6.

In Example 7, the catalyst unit of the present invention disposed on the upstream side of the catalyst unit that causes a comparatively small pressure loss has a gas disturbing effect. The disturbing effect reduces the irregularity of the distribution of ammonia concentration at the outlet of the catalyst unit of the present invention even if the distribution of ammonia concentration at the inlet of the catalyst unit and, consequently, the catalyst unit disposed on the downstream side works effectively.

Examples of the catalyst elements fabricated from perforated plates will be explained hereinafter.

EXAMPLE 8

A SUS 304 band of 0.2 mm in thickness and 500 mm in width was worked to obtain a metal lath having meshes of 2.1 mm in width arranged at a pitch of 2.1 mm, aluminum was deposited on the surface of the lath in 100 g/m$^2$ by an aluminum spraying process to roughen the surface of the metal lath, the metal lath was worked by pressing to obtain a catalyst support band of 0.9 mm in thickness having ribs having a height h=4.0 mm and flat sections having a width P=80 mm as shown in FIG. 4, and then the catalyst support band was cut to obtain catalyst support plates of 480 mm by 480 mm.

A catalytic slurry was prepared by dispersing 10 kg of the catalytic powder employed in Example 1 in 20 kg of water, the catalyst support plates were dipped in the catalytic slurry to coat the catalyst support plates with an about 500 μm thick catalytic slurry coating, compressed air was blown against the catalyst support plates coated with the catalytic slurry to remove the catalytic slurry stopping up the meshes, and then the catalyst support plates coated with the catalytic slurry were baked at 550° C. for 2 hr in the atmosphere to obtain catalyst elements 1.

Figure 16:
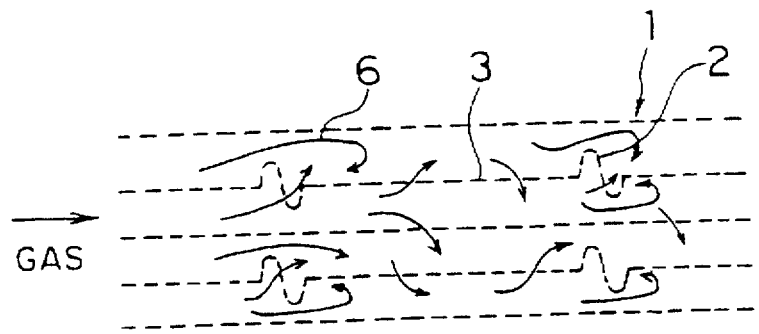
FIG. 16 is a diagrammatic side view showing a gas flow in a catalyst unit in Example 8 of the present invention.

The catalyst elements 1 shaped in predetermined dimensions were stacked as shown in FIG. 44 in a case having 2 mm thick walls, not shown, so that the ribs of the adjacent catalyst elements 1 extend perpendicular to each other to construct a catalyst unit 8 of 150 mm by 150 mm by 480 mm (depth). The catalyst unit 8 in Example 8 has a cross section typically shown in FIG. 16.

EXAMPLES 9 AND 10

Figure 17:
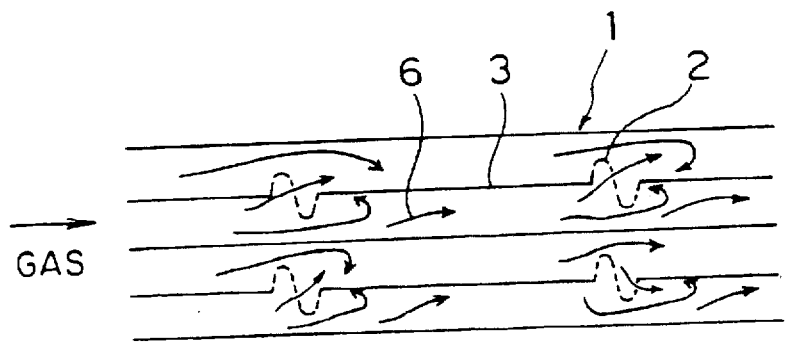
FIG. 17 is a diagrammatic side view showing a gas flow in a catalyst unit in Example 9 of the present invention.
Figure 18:
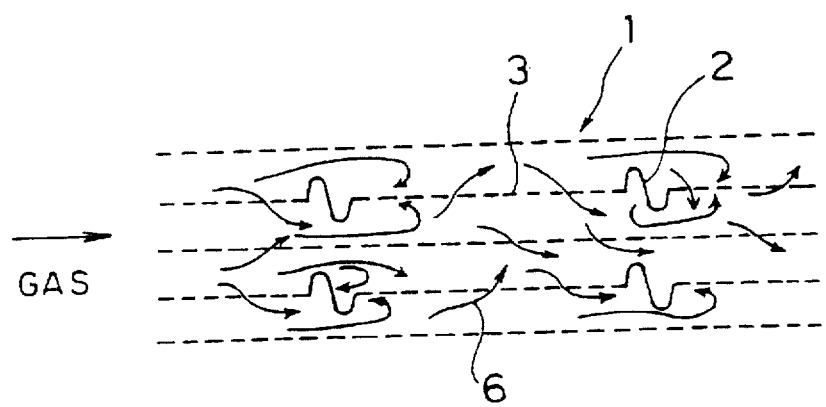
FIG. 18 is a diagrammatic side view showing a gas flow in a catalyst unit in Example 10 of the present invention.

Compressed air was blown against only the ribs 2 of catalyst support plates like those employed in Example 8 and coated with the catalytic slurry employed in Example 8 to remove only the catalytic slurry stopping up the meshes in the ribs 2 to obtain catalyst elements 1 having open meshes only in their ribs 2. The catalyst elements 1 were stacked to construct a catalyst unit in Example 9 having a cross section typically shown in FIG. 17. Compressed air was blown against only the flat sections 3 of catalyst support plates like those employed in Example 8 and coated with the catalytic slurry employed in Example 8 to remove only the catalytic slurry stopping up the meshes in the flat sections 3 to obtain catalyst elements 1 having open meshes only in their flat sections 3. The catalyst elements 1 were stacked to construct a catalyst unit in Example 10 having a cross section typically shown in FIG. 18.

Comparative Example 4

A catalytic paste was prepared by kneading a mixture of 20 kg of the catalytic powder employed in Example 8, 3 kg of Al$_2$O$_3$.SiO$_2$ inorganic fibers and 10 kg of water by a kneader for 1 hr. The catalytic paste was applied by a roller to 0.2 mm thick SUS 304 metal laths having surfaces roughened by aluminum spraying to obtain catalyst support laths of about 0.9 mm in thickness and 480 mm in length. The metal laths were worked by pressing to obtain catalyst support laths of 0.9 mm in thickness having ribs having a height h=4.0 mm and flat sections having a width P=80 mm as shown in FIG. 4, and then the catalyst support laths were baked at 550° C. for 2 hr in the atmosphere, and the thus baked catalyst support laths were cut to obtain catalyst elements 1 of predetermined dimensions. The catalyst elements 1 were stacked in a case having 2 mm thick walls so that the ribs 2 of the catalyst elements were parallel to the direction of the gas flow to construct a catalyst unit of 150 mm by 150 mm by 480 mm (depth) as shown in FIG. 43.

EXAMPLE 11

Figure 19:
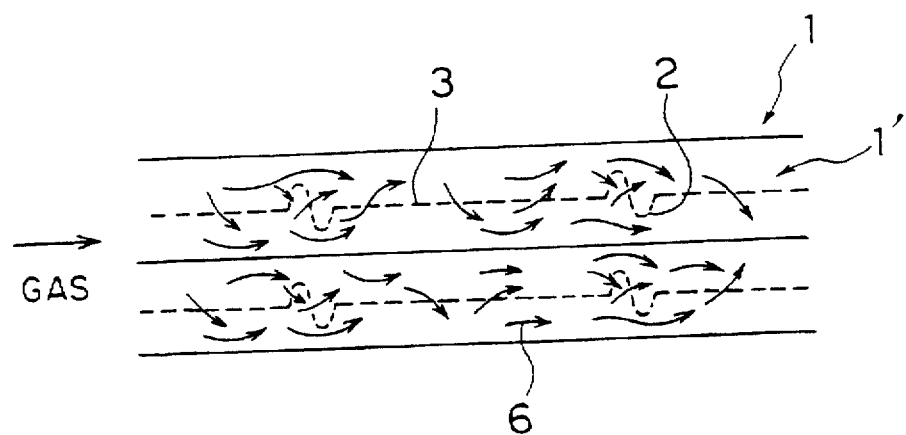
FIG. 19 is a diagrammatic side view showing a gas flow in a catalyst unit in Example 11 of the present invention.

The catalyst elements 1 employed in Example 8 and having open meshes in their entire areas and catalyst elements 1 employed in Comparative example 4 having meshes stopped up with the catalytic paste in their entire areas were stacked alternately with the ribs 2 of the former catalyst elements 1 extended perpendicular to the direction of the gas flow and the ribs 2 of the latter catalyst elements 1 extended in parallel to the direction of the gas flow to construct a catalyst unit of 150 mm by 150 mm by 480 mm (depth) having a cross section typically shown in FIG. 19.

EXAMPLE 12

The catalyst support plates from which the catalyst elements 1 employed in Example 8 and having open meshes in their entire areas were formed were cut in a rectangular shape so that the ribs 2 were inclined at 45° to a specified side edge 1a (FIG. 6) to obtain catalyst elements 1. The catalyst elements 1 and those turned upside down were stacked alternately in a case having 2 mm thick walls to construct a catalyst unit of 150 mm by 150 mm by 480 mm (depth).

EXAMPLE 13

Figure 20:
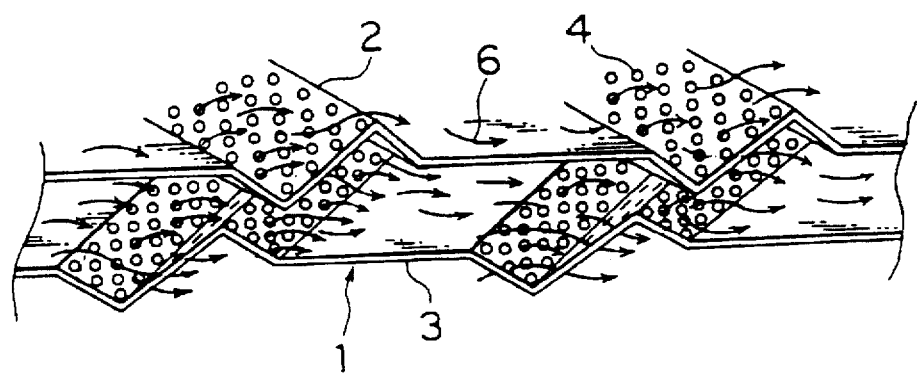
FIG. 20 is a perspective view showing a gas flow in a catalyst unit in Example 12 of the present invention.

The catalyst support plates from which the catalyst elements 1 employed in Example 8 and having open meshes only in their ribs 2 were formed were cut in a rectangular shape so that the ribs 2 were inclined at 45° to a specified side edge 1$a$ (FIG. 6) to obtain catalyst elements 1. The catalyst elements 1 and those turned upside down were stacked alternately in a case having 2 mm thick walls to construct a catalyst unit of 150 mm by 150 mm by 480 mm (depth) and shown in a fragmentary typical perspective view in FIG. 20.

Comparative Example 5

The catalyst elements employed in Comparative example 4 were stacked in a case so that the ribs 2 of the alternate catalyst elements 1 are perpendicular to the direction of the gas flow to construct a catalyst unit of 150 mm by 150 mm by 480 mm (depth as shown in FIG. 44).

Comparative Example 6

Catalyst elements 1 the same as those employed in Example 8, except that the height of the ribs 2 were 8 mm were stacked in a case having 2 mm thick walls so that all the ribs 2 are parallel to the direction of the gas flow to construct a catalyst unit of 150 mm by 150 mm by 480 mm (depth) as shown in FIG. 43.

Each of the catalytic structures in Examples 8 to 13 and Comparative examples 4 to 6 was installed in a reactor, an LPG combustion gas was passed through the catalyst units to measure their denitrating abilities and draft losses (pressure losses) caused by those catalyst units under the conditions tabulated in Table 1. Measured results are shown in Table 4.

TABLE 4

| Catalytic units | Draft loss (mmH$_2$O/m) | Denitrating (%) | Reaction rate (m/hr) |
| --- | --- | --- | --- |
| Ex. 8 | 48.8 | 69.8 | 108 |
| Ex. 9 | 33.5 | 60.2 | 83 |
| Ex. 10 | 42.6 | 65.2 | 95 |
| Ex. 11 | 27.0 | 56.5 | 75 |
| Ex. 12 | 38.1 | 64.0 | 92 |
| Ex. 13 | 28.0 | 58.1 | 78 |
| Comp. Ex. 4 | 10.1 | 43.3 | 51 |
| Comp. Ex. 5 | 80.8 | 73.3 | 119 |
| Comp. Ex. 6 | 15.0 | 51.4 | 65 |

As is obvious from Table 4, although Comparative examples 4 and 6 cause comparatively small draft losses, the denitrating efficiencies of Comparative examples 4 and 6 are low and the effects of the same on reaction rate are as low as 0.5 to 0.7 times the effects of Examples 8 to 13 on reaction rate. Although the denitrating efficiency of Comparative example 5 of the same construction as those of Examples 8 to 13 and comprising the catalyst elements in which all the meshes are stopped up is high, Comparative example causes a great draft loss. The respective denitrating efficiencies and effects of Examples 8 to 10 on reaction rate are on substantially the same level, and the draft losses caused by Examples 8 to 10 are about half that caused by Comparative example 5.

Thus, the catalyst units of the present invention comprising the catalyst elements having open meshes have excellent denitrating abilities and cause low draft losses, respectively.

Examples employing two types of catalyst elements 1 and 1' respectively having ribs 2 and 2' of different heights, and alternately stacked with the ridges of the ribs 2 and 2' extended perpendicular to each other will be described hereinafter.

EXAMPLE 14

A catalytic paste was prepared by kneading a mixture of 20 kg of the catalytic powder employed in Example 1, 3 kg of Al$_2$O$_3$·SiO$_2$ inorganic fibers and 10 kg of water by a kneader for 1 hr. The catalytic paste was applied by a roller to 0.2 mm thick SUS 304 metal laths having surfaces roughened by aluminum spraying to obtain catalyst support laths of about 0.9 mm in thickness and 500 mm in length. The metal laths were worked by pressing to obtain catalyst support laths of 0.9 mm in thickness having wavelike ribs 2 having a height h$_1$=6 mm and flat sections 3 having a width P$_1$=120 mm as shown in FIG. 22($a$) and catalyst support laths of 0.9 mm in thickness having wavelike ribs 2' having a height h$_2$=4 mm and flat sections 3' having a width P$_2$=60 mm as shown in FIG. 22($b$), and then the catalyst support laths were baked at 550° C. for 2 hr in the atmosphere after air drying to obtain catalyst elements 1 and 1' (h$_2$/h$_1$=4/6).

Figure 21:
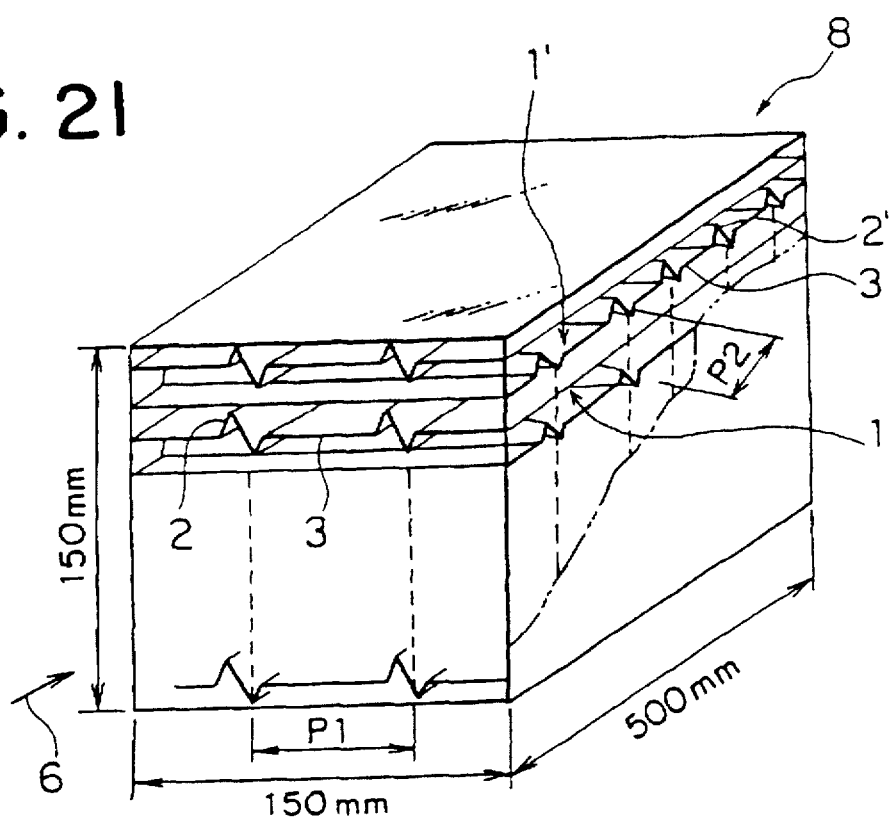
FIG. 21 is a perspective view of a catalyst unit in Examples 14 and 15 of the present invention.

The catalyst elements 1 and 1' were stacked alternately so that the respective ribs 2 and 2' of the catalyst elements 1 and 1' were perpendicular to each other to construct a catalyst unit 8 of 150 mm by 150 mm by 500 mm (depth) as shown in FIG. 21. The catalyst unit was disposed with the lower ribs 2' of the catalyst elements 1' extended perpendicular to the direction of the gas flow.

EXAMPLE 15

Figure 22:
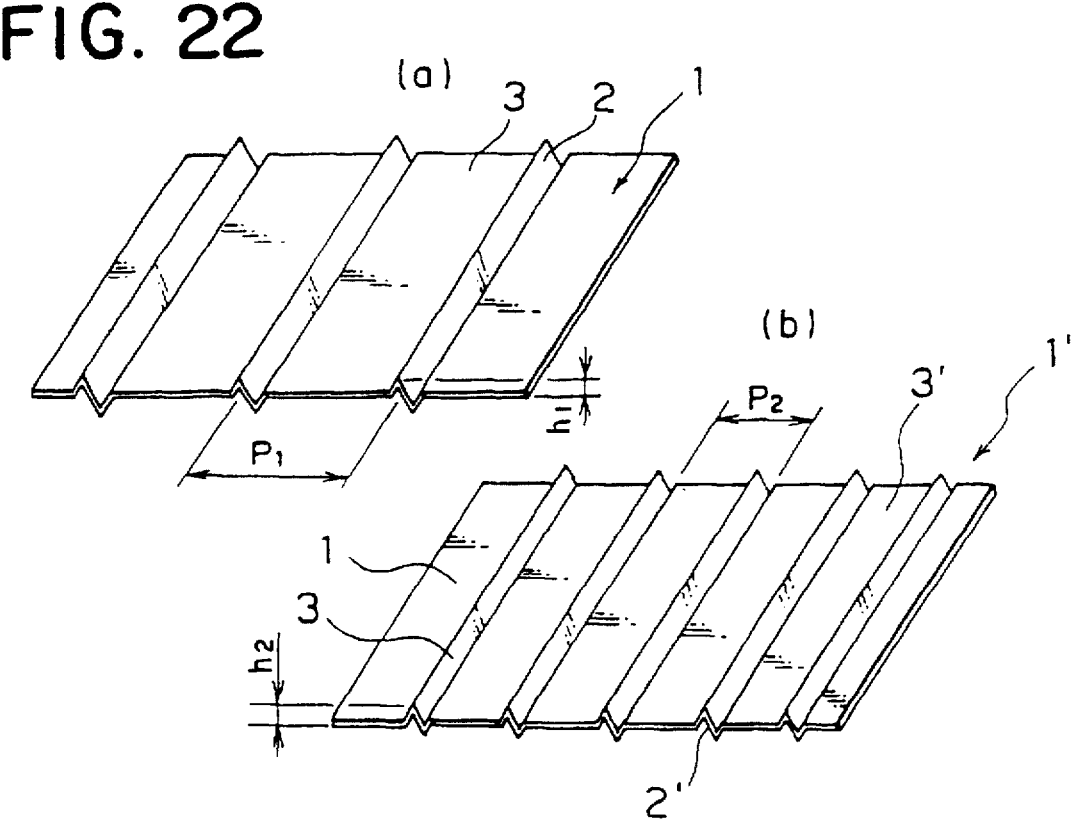
FIGS. 22(a) and 22(b) are perspective views of catalyst elements, respectively, employed in Examples 14 and 15 of the present invention.
Figure 23:
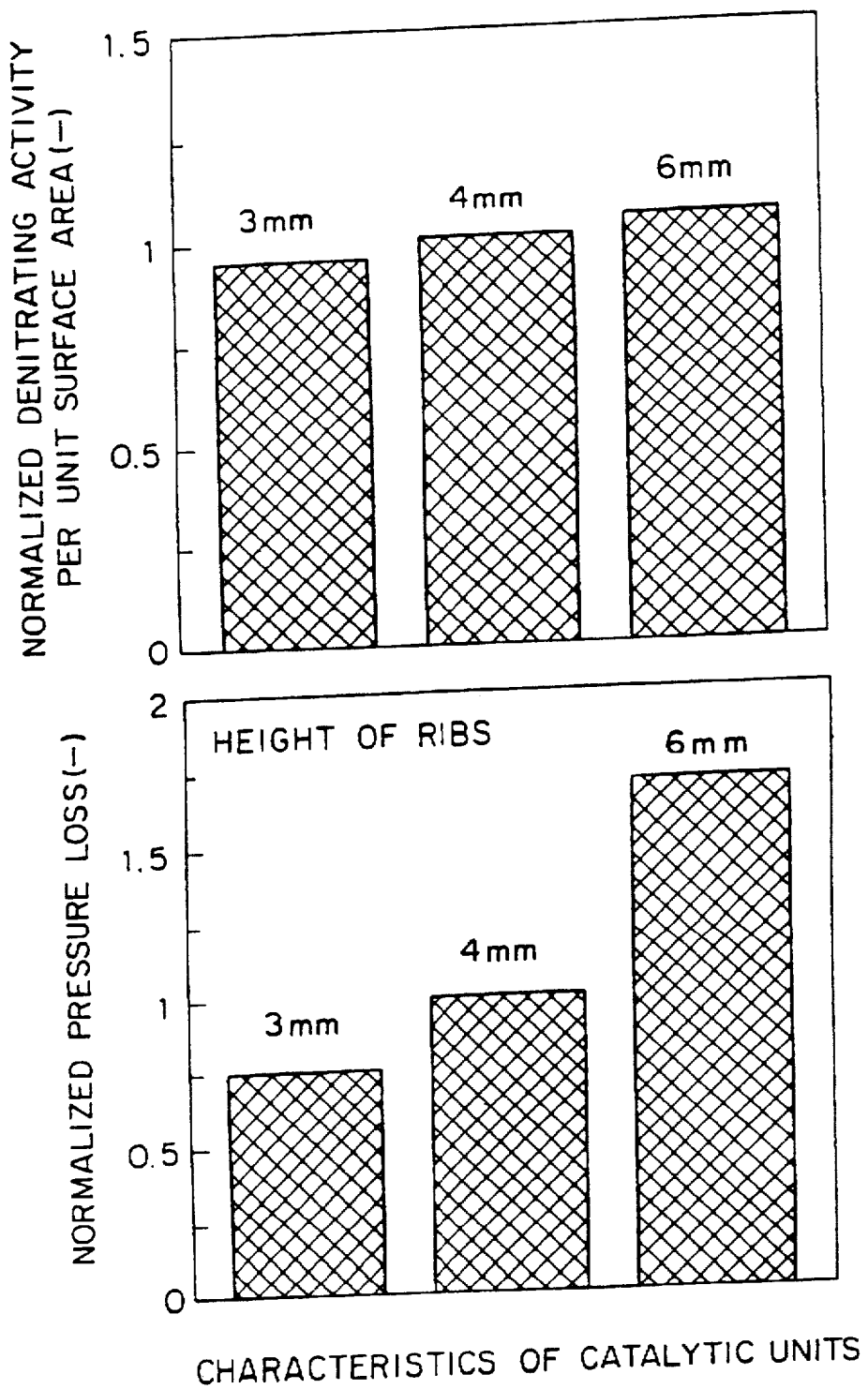
FIG. 23 is a diagram showing the characteristics of catalyst units comprising catalyst elements provided with ribs of different heights.

Metal laths prepared by the same process as that by which the metal laths from which the catalyst elements employed in Example 14 were formed were worked by pressing to obtain catalyst support laths having wavelike ribs 2 having a height h$_1$=7 mm and flat sections 3 having a width P$_1$=120 mm as shown in FIG. 22($a$) and catalyst support laths having wavelike ribs 2' having a height h$_2$=3 mm and flat sections 3' having a width P$_2$=60 mm as shown in FIG. 22($b$), and then the catalyst support laths were baked at 550° C for 2 hr in the atmosphere after air drying to obtain catalyst elements 1 and 1' (h$_2$/h$_1$=3/7).

The catalyst elements 1 and 1' were stacked alternately so that the respective ribs 2 and 2' of the catalyst elements 1 and 1' were perpendicular to each other to construct a catalyst unit 8 of 150 mm by 150 mm by 500 mm (depth) as shown in FIG. 21. The catalyst unit was disposed with the lower ribs 2' of the catalyst elements 1' extended perpendicular to the direction of the gas flow 6.

Comparative Example 7

Catalyst elements similar to the catalyst elements 1 employed in Example 14, except that the ribs 2 had a height h=5 mm, were stacked with all the ribs 2 parallel to each other in a case to construct a catalyst unit of 150 mm by 150 mm by 500 mm (depth) as shown in FIG. 43. The catalyst unit was disposed with the ribs 2 of the catalyst elements 1 extended in parallel to the direction of the gas flow 6.

Comparative Example 8

The catalyst elements 1 employed in Comparative example 7 were stacked with the ridges of the respective ribs 2 of the adjacent catalyst elements 1 extended perpendicular to each other to construct a catalyst unit 8 of 150 mm by 150 mm by 500 mm (depth) as shown in FIG. 44.

Comparative Example 9

Catalyst elements 1 similar to the catalyst elements 1 employed in Example 14, except that the height $h_1$ of the ribs 2 was 10 mm, were stacked to construct a catalyst unit 8 of 150 mm by 150 mm by 500 mm (depth) as shown in FIG. 43.

Each of the catalyst units 8 in Examples 14 and 15 and Comparative examples 7 to 9 was installed in a reactor and an LPG combustion exhaust gas was passed through the catalytic structures 8 under the conditions tabulated in Table 1 to measure the respective denitrating abilities and draft resistances of the catalyst units 8. Measured results are shown in Table 5.

As is obvious from Table 5, the draft resistances of the catalyst units 8 in Examples 14 and 15 of the present invention are smaller than that of the catalyst unit 8 in Comparative example 8, and the denitrating abilities of the catalyst units 8 in Examples 14 and 15 are approximately equal to that of the catalyst unit 8 in Comparative example 8.

TABLE 5

| Catalytic units | Denitrating eff. (%) | Draft resistance (mmH$_2$O) |
|---|---|---|
| Ex. 14 | 80 | 25 |
| Comp. Ex. 7 | 65 | 16 |
| Comp. Ex. 8 | 80 | 38 |
| Comp. Ex. 9 | 53 | 8 |
| Ex. 15 | 78 | 18 |

The high effects of the catalyst units 8 in Examples 14 and 15 of the present invention on overall reaction rate, as compared with that of the catalyst unit 8 in Comparative example 9, give the catalyst units 8 in Examples 14 and 15 improved denitrating abilities.

In Example 14, since the catalyst elements 1 having ribs 2 of a height $h_1$=6 mm (FIG. 22(a)) and catalyst elements 1' having the ribs 2' of a height $h_2$=4 mm (FIG. 22(b)) are stacked alternately and the ridges of the ribs 2 and 2' rest one upon another, the interval between the adjacent catalyst elements 1 and 1' is 10 mm, which is equal to the interval between the adjacent catalyst elements 1 in the catalyst units 8 in Comparative examples 8 and 9.

It is known from the measured results shown in Table 5 that Example 14 needs a less amount of catalyst than Comparative example 9 for a denitrating efficiency of 80% as shown in Table 6 because the denitrating efficiency of Example 14 is higher than that of Comparative example 9 for the same areal velocity and that the denitrating unit in Example 14 can be formed in a construction more compact than that in Comparative example 9.

TABLE 6

| Catalyst units | Activity ratio | Spec. necessary amt. Catalyst (length) | Pressure loss for 80% (mmH$_2$O) |
|---|---|---|---|
| Ex. 14 | 1.00 | 1.00 | 25 |
| Comp. Ex. 7 | 0.65 | 1.54 | 25 |
| Comp. Ex. 8 | 1.00 | 1.00 | 38 |
| Comp. Ex. 9 | 0.47 | 2.13 | 17 |
| Ex. 15 | 0.94 | 1.06 | 19 |

Figure 24:
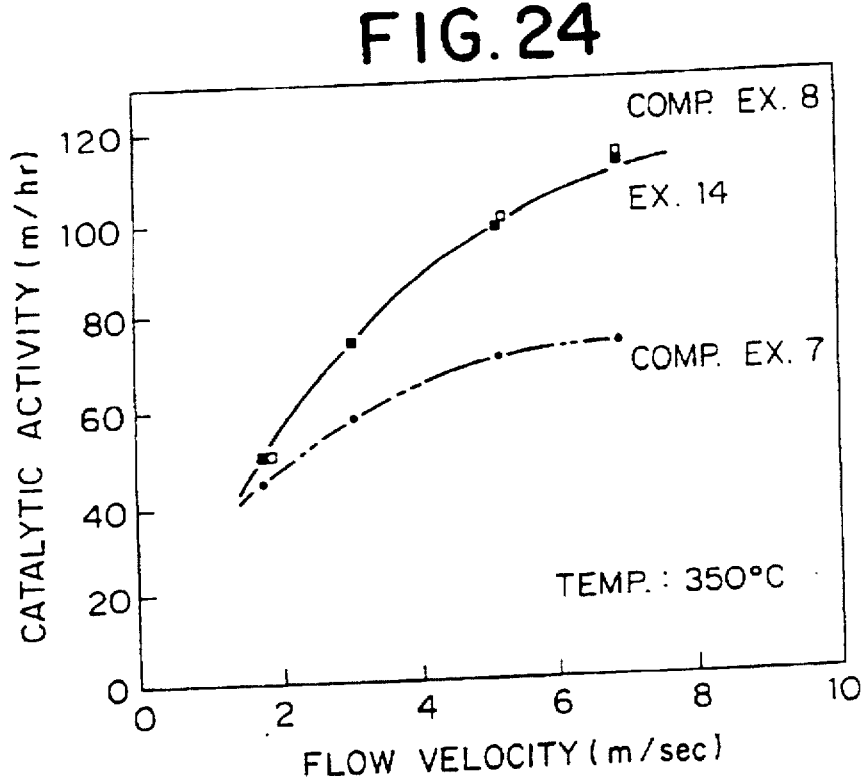
FIG. 24 is a graph showing the flow velocity characteristics of the catalytic ability of catalyst units in Example 14 of the present invention and Comparative examples 7 and 8.
Figure 25:
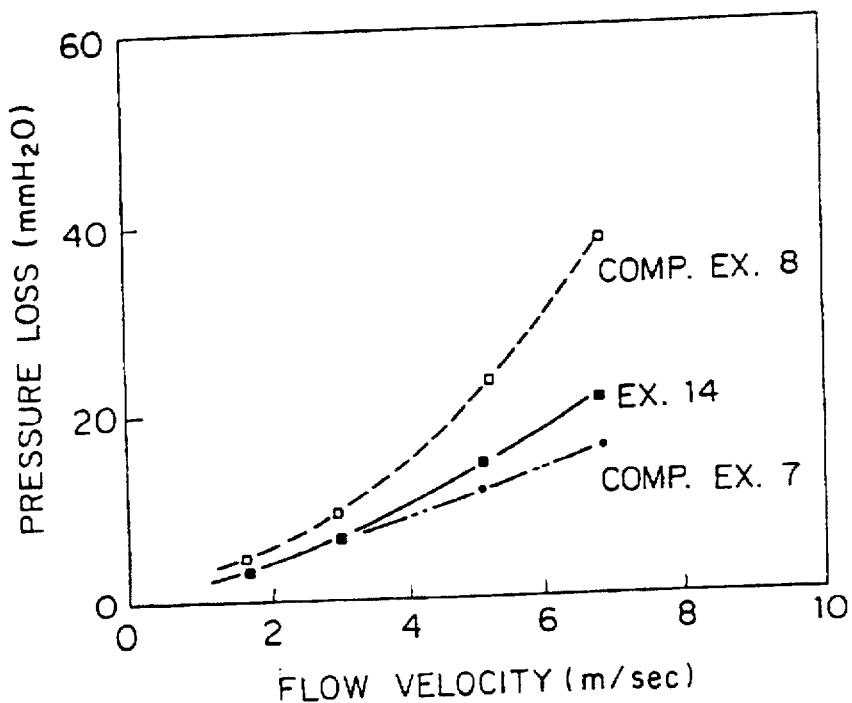
FIG. 25 is a graph showing the flow velocity characteristics of pressure loss caused by the catalyst units in Example 14 of the present invention and Comparative examples 7 and 8.
Figure 26:
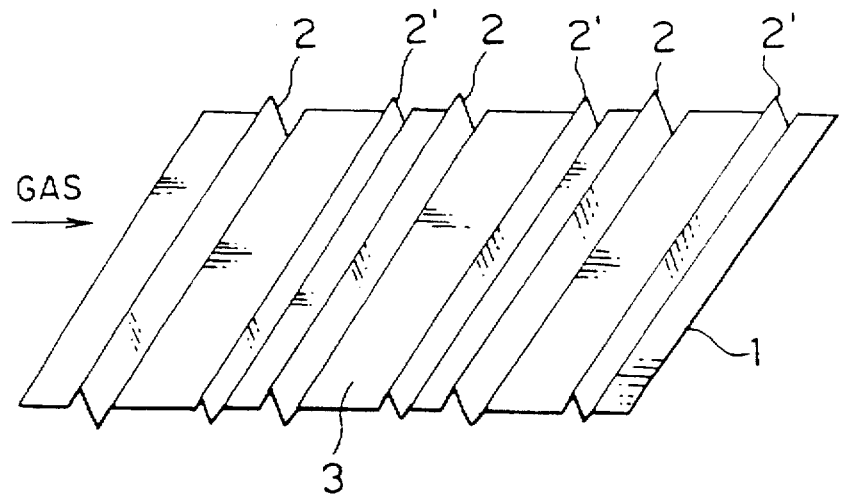
FIG. 26 is a perspective view of a catalyst element employed in Example 16 of the present invention.

FIG. 24 shows the variation of catalytic activity with gas flow velocity for Example 14 and Comparative examples 7 and 8, and FIG. 25 shows the variation of pressure loss with gas flow velocity for Example 14 and Comparative examples 7 and 8.

It is known from FIG. 24, the catalytic activities of the catalyst units in Example 14 and Comparative example 8, as compared with that of the catalyst unit in Comparative example 7 having a gas passage parallel to the direction of the gas flow, increase sharply with the increase of gas flow velocity.

The catalytic activity of the catalyst unit in Example 14 decreases near to that of the catalyst unit in Comparative example 7 as the gas flow velocity decreases near to 2 m/sec, which is inferred to be due to the high gas disturbing effect of the ribs 2' of the catalyst elements 1' extended perpendicular to the direction of the gas flow 6 when the gas flow velocity is high and the gas stagnating effect of the same when the gas flow velocity is low.

Therefore, it is preferable that the gas flow velocity is in the range of 2 m/sec or above and below 10 m/sec, more preferably, in the range of 4 m/sec or above and below 8 m/sec, in which the pressure loss is not practically significant when the catalyst unit 8 of the present invention is used. The ribs 2' is unable to disturb the gas flow 6 if the gas flow velocity is excessively low, and the pressure loss is excessively large if the gas flow velocity is excessively high.

Examples of catalyst units each constructed by stacking catalyst elements 1 each having two types of parallel ribs 2 and 2' having different heights with the ridges of the respective ribs 2 and 2' of the adjacent catalyst elements 1 extended perpendicular to each other will be described hereinafter.

EXAMPLE 16

Figure 29:
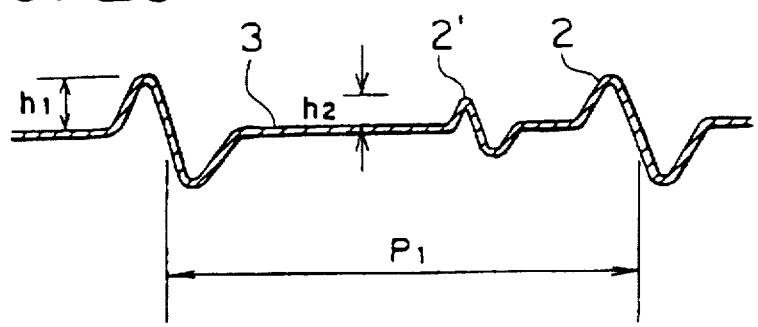
FIG. 29 is a fragmentary sectional view of a catalyst element applicable to Example 16 of the present invention.
Figure 30:
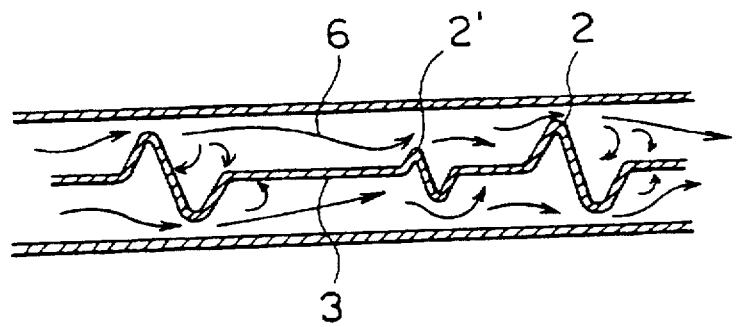
FIG. 30 is a sectional view showing a gas flow in a catalyst unit employed in Example 16.

A catalytic paste was prepared by kneading a mixture of 20 kg of the catalytic powder employed in Example 1, 3 kg of Al$_2$O$_3$.SiO$_2$ inorganic fibers and 10 kg of water by a kneader for 1 hr. The catalytic paste was applied by a roller to 0.2 mm thick SUS 304 metal laths having surfaces roughened by aluminum spraying to obtain catalyst support laths of about 0.9 mm in thickness and 500 mm in length. The metal laths were worked by pressing to obtain catalyst support laths of 0.9 mm in thickness having wavelike higher ribs 2 having a height $h_1$=3 mm, lower ribs 2' having a height $h_2$=2.5 mm and flat sections 3 having a width $P_1$=100 mm as shown in FIG. 29, and then the catalyst support laths were baked at 550° C. for 2 hr in the atmosphere after air drying to obtain catalyst elements 1.

Figure 27:
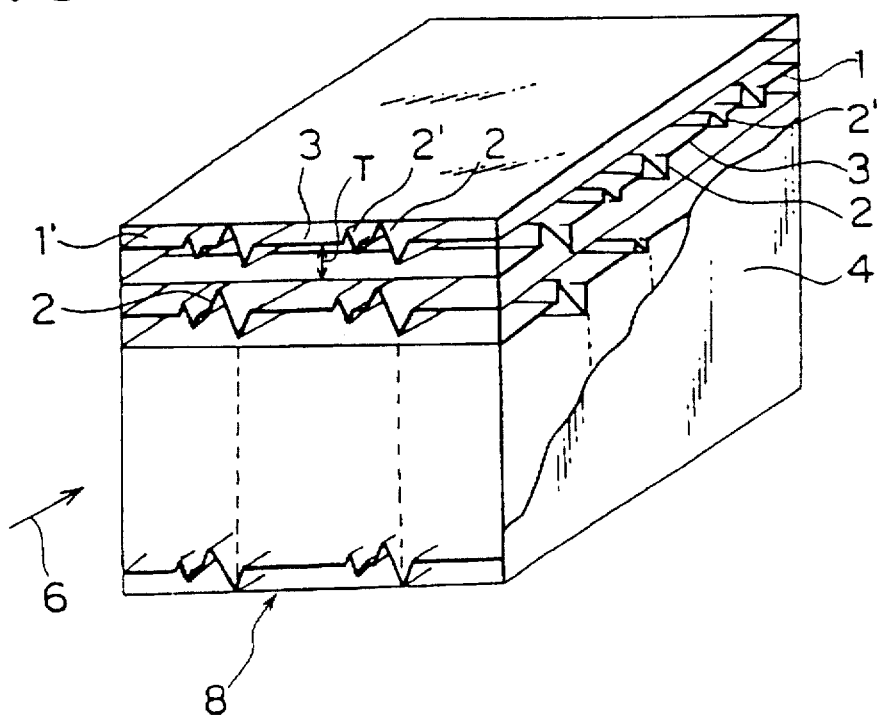
FIG. 27 is a perspective view of a catalyst unit employed in Example 16.
Figure 28:
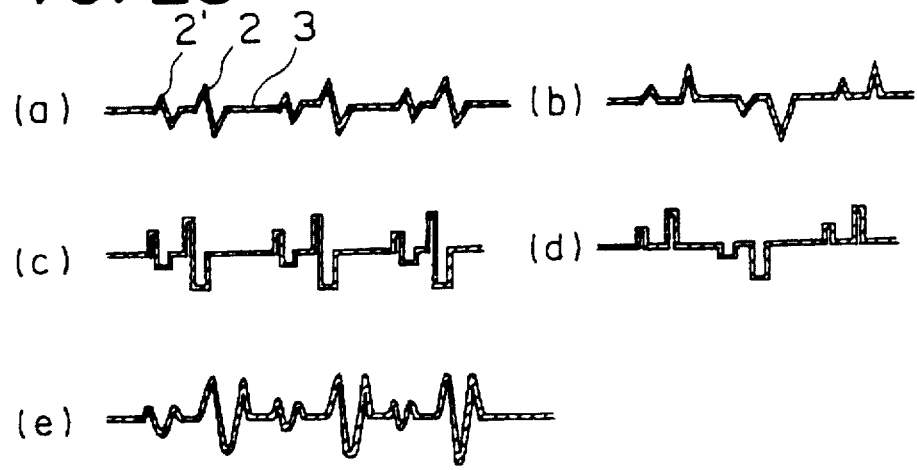
FIGS. 28(a), 28(b), 28(c), 28(d) and 28(e) are side views of examples of ribs of catalyst elements applicable to Example 16 of the present invention.

The catalyst elements 1 and catalyst elements 1' having ribs 2 and 2' of the same height were stacked alternately so that the respective ribs of the catalyst elements 1 and 1' extend perpendicular to each other in a case 4 shown in FIG. 27 to construct a catalyst unit 8 of 150 mm by 150 mm by 500 mm (depth). The catalyst unit 8 was disposed with the ridges of the ribs 2 of either the catalyst elements 1 or 1' parallel to the direction of the gas flow 6.

Comparative Example 10

Catalyst elements similar to those employed in Example 16, except that the ribs 2 and 2' have equal height of 6 mm from the surface of the flat sections 3, were fabricated. The catalyst elements were stacked so that the ribs 2 and 2' extend in parallel to the direction of the gas flow in a case to construct a catalyst unit of 150 mm by 150 mm by 500 mm as shown in FIG. 43.

Comparative Example 11

The catalyst elements having the ribs of equal height employed in Comparative example 10 were stacked so that the respective ribs 2 of the adjacent catalyst elements are perpendicular to each other in a case, not shown, as shown in FIG. 44 to construct a catalyst unit of 150 mm by 150 mm by 500 mm (depth).

Each of the catalyst units in Example 16 and Comparative Examples 10 and 11 were installed in a reactor and an LPG combustion gas was passed through the catalyst units to measure the denitrating abilities and draft resistance of the catalyst units under the conditions tabulated in Table 1. Measured results are shown in Table 7.

TABLE 7

| Catalyst units | Denitrating eff. (%) | Pressure loss (mmH$_2$O) |
| --- | --- | --- |
| Ex. 16 | 85 | 24 |
| Comp. Ex. 10 | 65 | 16 |
| Comp. Ex. 11 | 89 | 38 |

As is obvious from Table 7, the catalyst unit in Example 16 is smaller in draft resistance than and substantially equal in denitrating ability to the catalyst unit in Comparative example 11. The catalyst unit in Example 16, as compared with the catalyst unit in Comparative example 10, has a high denitrating ability owing to its effect in increasing overall reaction rate.

Figure 31:
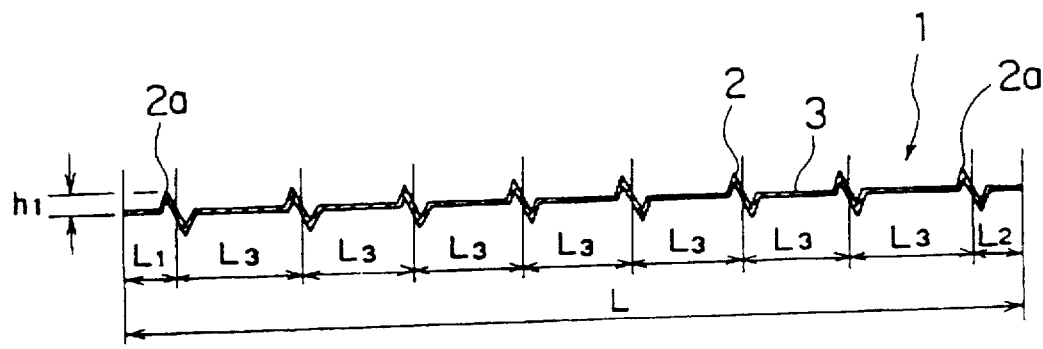
FIG. 31 is a side view of a catalyst element employed in examples 17-1 to 18-3 of the present invention.

Description will be made of catalyst units each constructed by stacking the catalyst elements 1 shown in FIG. 31 so that the respective ribs 2 of the adjacent catalyst elements are perpendicular to each other and disposed in a gas passage with the ribs 2 of the alternate catalyst elements 1 extended perpendicular to the direction of the gas flow 6 (FIG. 27), in which the distances $L_1$ and $L_2$ from the opposite ends of each of the catalyst elements 1 having the ribs 2 extending perpendicular to the direction of the gas flow 6 with respect to the direction of flow of the gas flow 6 to the first rib 2a from one end of the catalyst element 1 and the first rib 2a from the other end of the same catalyst element 1 are eight times of the interval T between the adjacent catalyst elements 1 (FIG. 27) or below.

EXAMPLE 17-1

A catalytic paste was prepared by kneading a mixture of 20 kg of the catalytic powder employed in Example 1, 3 kg of $Al_2O_3 \cdot SiO_2$ inorganic fibers and 10 kg of water by a kneader for 1 hr. The catalytic paste was applied by a roller to 0.2 mm thick SUS 304 metal laths having surfaces roughened by aluminum spraying to obtain catalyst support laths of about 0.9 mm in thickness and L mm in length. The metal laths were worked by pressing and processed to obtain catalyst elements 1 having wavelike ribs 2 having a height $h_1=3$ mm and arranged at a pitch $L_3=60$ mm as shown in FIG. 31 in a sectional view and then the catalyst support laths were baked at 550° C. for 2 hr in the atmosphere after air drying to obtain catalyst elements 1. Then, the twenty-two catalyst elements 1 were stacked at intervals T to construct a catalyst unit 8 as shown in FIG. 44. The distances $L_1$ and $L_2$ from the opposite ends of each catalyst element 1 disposed with its ribs 2 extended perpendicular to the direction of gas flow 6 to the first rib 2a from one end and to the first rib 2a from the other end respectively were 30 mm, which was five times the interval T.

EXAMPLE 18-1

A catalyst unit 8 in Example 18-1 was similar to the catalyst unit 8 in Example 17-1 and was constructed by stacking twenty-two catalyst elements 1 the same as those employed in Example 17-1 and having ribs 2 of a height $h_1=3$ mm arranged at a pitch $L_3=60$ mm at intervals T=6 mm. However, in the catalyst unit 8 in Example 18-1, both the distances $L_1$ and $L_2$ were 50 mm, which was eight times the interval T.

Comparative Example 12-1

A catalyst unit 8 in Comparative example 12-1 was similar to the catalyst unit 8 in Example 17-1 and was constructed by stacking twenty-two catalyst elements 1 the same as those employed in Example 17-1 and having ribs 2 of a height $h_1=3$ mm arranged at a pitch $L_3=60$ mm at intervals T=6 mm. However, in the catalyst unit 8 in Comparative example 12-1, both the distances $L_1$ and $L_2$ were 50 mm, which was ten times the interval T.

EXAMPLE 17-2

A catalyst unit 8 in Example 17-2 was similar in construction to that in Example 17-1, except that, in the catalyst unit 8 in Example 17-2, the ribs 2 extending in parallel to the direction of the gas flow 6 had a height $h_1=3$ mm and were arranged at a pitch $L_3=60$ mm, the ribs 2 extending perpendicular to the direction of gas flow 6 had a height $h_1=5$ mm and were arranged at a pitch $L_3=60$ mm, the number of the catalyst elements 1 was eighteen, the interval T between the adjacent catalyst elements 1 was 8 mm, and both the distances $L_1$ and $L_2$ from the opposite ends of each of the catalyst elements 1 disposed with their ribs 2 extended perpendicular to the direction of the gas flow 6 to the first rib 2 from one end and the first rib 2 from the other end were 40 mm, which was five times the interval T.

EXAMPLE 18-2

A catalyst unit 8 in Example 18-2 was similar in construction to that in Example 17-1, except that, in the catalyst unit 8 in Example 18-2, the ribs 2 extending in parallel to the direction of the gas flow 6 had a height $h_1=3$ mm and were arranged at a pitch $L_3=60$ mm, the ribs 2 extending perpendicular to the direction of gas flow 6 had a height $h_1=5$ mm and were arranged at a pitch $L_3=60$ mm, the number of the catalyst elements 1 was eighteen, the interval T between the adjacent catalyst elements 1 was 8 mm, and both the distances $L_1$ and $L_2$ from the opposite ends of each of the catalyst elements 1 disposed with their ribs 2 extended perpendicular to the direction of the gas flow 6 to the first rib 2 from one end and the first rib 2 from the other end were 64 mm, which was eight times the interval T.

Comparative Example 12-2

A catalyst unit 8 in Comparative example 12-2 was similar in construction to that in Example 17-1, except that, in the catalyst unit 8 in Comparative example 12-2, the ribs 2 extending in parallel to the direction of the gas flow 6 had a height $h_1=3$ mm and were arranged at a pitch $L_3=60$ mm, the ribs 2 extending perpendicular to the direction of gas flow 6 had a height $h_1=5$ mm and were arranged at a pitch $L_3=60$ mm, the number of the catalyst elements 1 was eighteen, the interval T between the adjacent catalyst elements 1 was 8 mm, and both the distances $L_1$ and $L_2$ from the opposite ends of each of the catalyst elements 1 disposed with their ribs 2 extended perpendicular to the direction of the gas flow 6 to the first rib 2 from one end and the first rib 2 from the other end were 80 mm, which was ten times the interval T.

EXAMPLE 17-3

A catalyst unit 8 in Example 17-3 was similar in construction to that in Example 17-1, except that, in the catalyst unit 8 in Example 17-3, the ribs 2 extending in parallel to the direction of the gas flow 6 had a height $h_1=3$ mm and were arranged at a pitch $L_3=60$ mm, the ribs 2 extending perpendicular to the direction of gas flow 6 had a height $h_1=7$ mm and were arranged at a pitch $L_3=60$ mm, the number of the catalyst elements 1 was fifteen, the interval T between the adjacent catalyst elements 1 was 10 mm, and both the distances $L_1$ and $L_2$ from the opposite ends of each of the catalyst elements 1 disposed with their ribs 2 extended perpendicular to the direction of the gas flow 6 to the first rib 2 from one end and the first rib 2 from the other end were 50 mm, which was five times the interval T.

EXAMPLE 18-3

A catalyst unit 8 in Example 18-3 was similar in construction to that in Example 17-1, except that, in the catalyst unit 8 in Example 18-3, the ribs 2 extending in parallel to the direction of the gas flow 6 had a height $h_1=3$ mm and were arranged at a pitch $L_3=60$ mm, the ribs 2 extending perpendicular to the direction of gas flow 6 had a height $h_1=7$ mm and were arranged at a pitch $L_3=60$ mm, the number of the catalyst elements 1 was fifteen, the interval T between the adjacent catalyst elements 1 was 10 mm, and both the distances $L_1$ and $L_2$ from the opposite ends of each of the catalyst elements 1 disposed with their ribs 2 extended perpendicular to the direction of the gas flow 6 to the first rib 2 from one end and the first rib 2 from the other end were 80 mm, which was eight times the interval T.

Comparative Example 12-3

A catalyst unit 8 in Comparative example 12-3 was similar in construction to that in Example 17-1, except that, in the catalyst unit 8 in Comparative example 12-3, the ribs 2 extending in parallel to the direction of the gas flow 6 had a height $h_1=3$ mm and were arranged at a pitch $L_3=60$ mm, the ribs 2 extending perpendicular to the direction of gas flow 6 had a height $h_1=7$ mm and were arranged at a pitch $L_3=60$ mm, the number of the catalyst elements 1 was fifteen, the interval T between the adjacent catalyst elements 1 was 10 mm, and both the distances $L_1$ and $L_2$ from the opposite ends of each of the catalyst elements 1 disposed with their ribs 2 extended perpendicular to the direction of the gas flow 6 to the first rib 2 from one end and the first rib 2 from the other end were 100 mm, which was ten times the interval T.

Each of the catalyst units 8 in Examples 17-1 to 17-3 and 18-1 to 18-3 and Comparative examples 12-1 to 12-3 was installed in a reactor and an LPG combustion gas was passed through the catalyst units 8 to measure the denitrating abilities of the catalyst units 8 and pressure losses caused by the catalyst units 8 under the conditions tabulated in Table 1, except that areal velocity was in the range of 20 to 80 m/hr, and the effects of the height $h_1$ of the ribs 2 of the catalyst elements 1 and the interval T between the catalyst elements 1 were evaluated comparatively.

Figure 33:
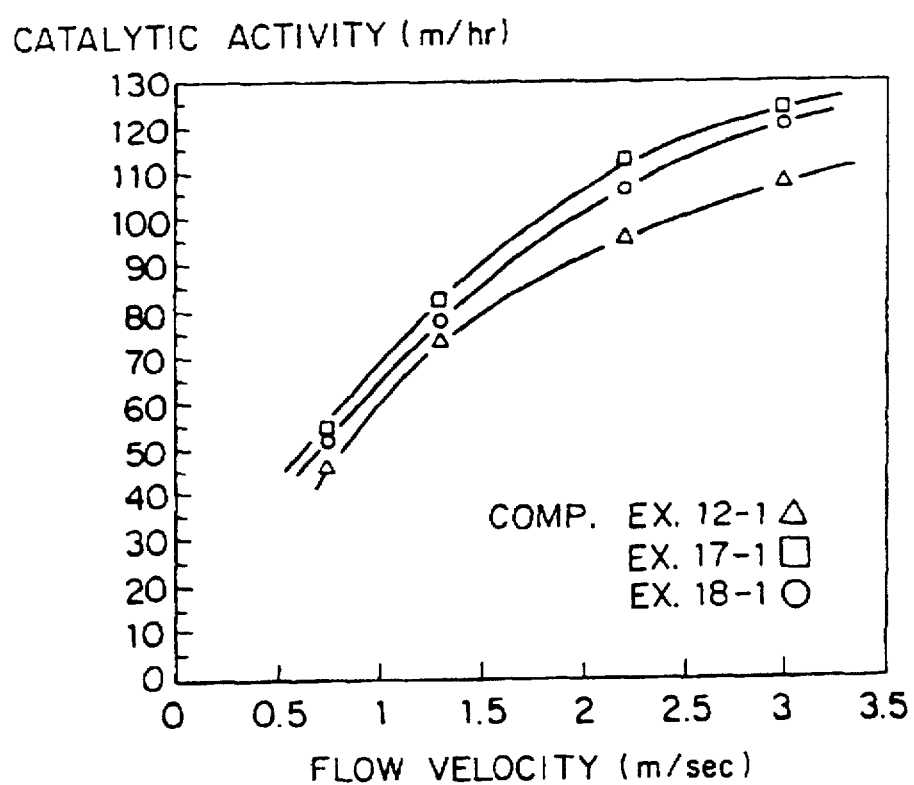
FIG. 33 is a graph comparatively showing the catalytic activities of Examples 17-1 and 18-1 and that of prior art.
Figure 34:
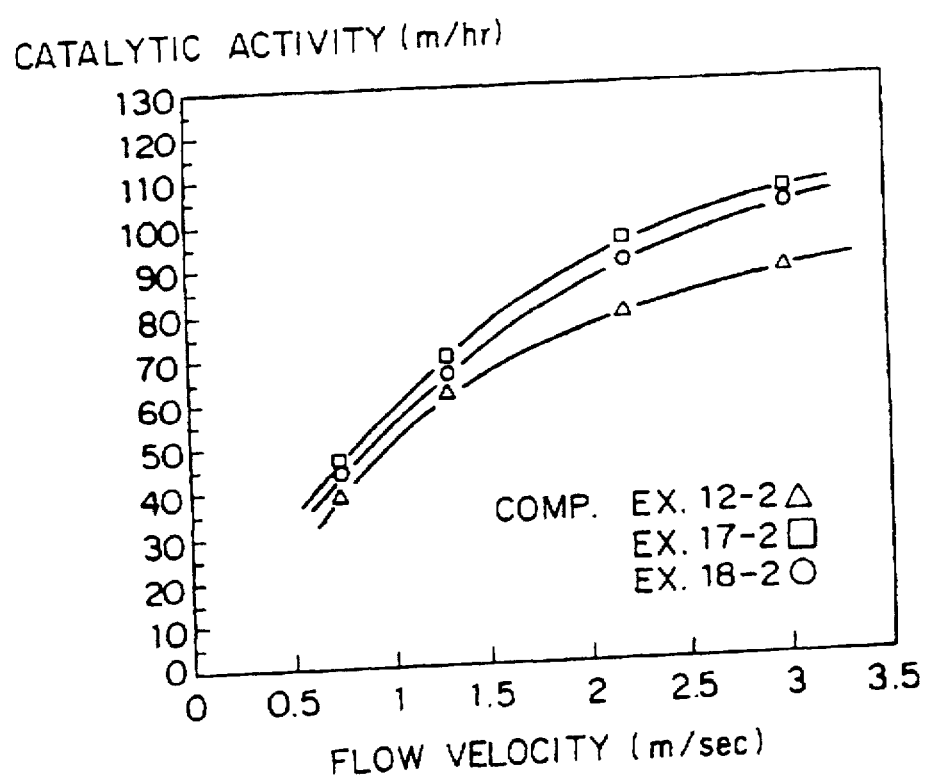
FIG. 34 is a graph comparatively showing the catalytic activities of Examples 17-2 and 18-2 and that of prior art.
Figure 35:
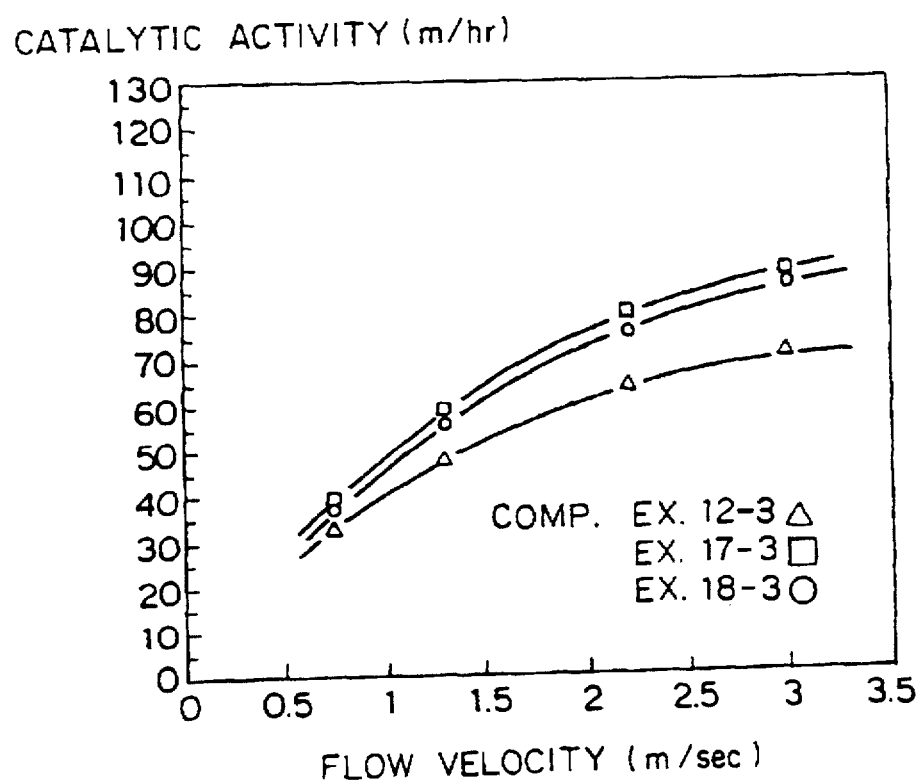
FIG. 35 is a graph comparatively showing the catalytic activities of Examples 17-3 and 18-3 and that of prior art.

FIGS. 33, 34 and 35 are graphs showing the measured flow velocity characteristics of denitrating ability and pressure loss.

The catalytic activities of the catalyst units 8 in Examples 17-1 to 17-3 and 18-1 to 18-3 are evidently higher than those of the catalyst units 8 in Comparative examples 12-1 to 12-3, which are the height $h_1$ of the ribs 2 and the interval T between the catalytic layers 1 as those in Examples 17-1 to 17-3 and 18-1 to 18-3, respectively.

The catalytic activities of the catalyst units 8 in Examples 17-1 to 17-3 are higher than those of the corresponding catalyst units 8 in Examples 18-1 to 18-3, which proves that the catalyst unit 8 is able to exhibit a high performance when the distances $L_1$ and $L_2$ from the opposite ends of each of the catalyst elements 1 disposed with their ribs 2 extended perpendicular to the direction of the gas flow 6 to the first rib 2 from one end and the first rib 2 from the other end are eight times the interval T between the adjacent catalyst elements 1 or below and to exhibit a further higher performance when the distances $L_1$ and $L_2$ are five times the interval T or below. When the distances $L_1$ and $L_2$ are greater than eight times the interval T, the end portions of the catalyst elements 1 bend to reduce the performance of the catalyst unit 8 markedly.

Description will be made of experiments on the catalyst units in the examples employing the catalyst elements 1 in which the ribs 2 are arranged at a given pitch $L_3$ determined by equally dividing the distance $|L-(L_1+L_2)|$ between the first ribs 2a from the opposite ends, respectively, of the catalyst element 1 so that the pitch $L_3$ is ten to twenty-three times the interval T (FIG. 27) between the adjacent catalyst elements 1.

The effect of the pitch $L_3$ (FIG. 31) between the ribs of the catalyst elements 1 disposed with the ribs 2 extended perpendicular to the direction of the gas flow 6 on pressure loss was verified.

Experiment 1

Catalyst units 8 similar to the catalyst unit 8 in Example 17-1 were constructed by stacking twenty-two catalyst elements 1 having ribs 2 of a height $h_1=3$ mm at equal intervals T=6 mm, in which the distances $L_1$ and $L_2$ from the opposite ends of each of the catalyst elements 1 having the ribs 2 extended perpendicular to the direction of the gas flow 6 with respect to the direction of flow of the gas flow 6 to the first rib from one end of the catalyst element 1 and the first rib from the other end of the same catalyst element 1 were 10 mm, which was about 1.7 times the interval T between the adjacent catalyst elements 1. In the catalyst units 8, the pitches $L_3$ of the ribs were 20, 40, 60, 80, 120, 140 and 160 mm, respectively; that is, the pitches $L_3$ were about three to twenty-seven times the interval T between the adjacent catalyst elements 1, respectively. Pressure losses caused by the catalyst units 8 were measured under the conditions tabulated in Table 1 through experiments using an LPG combustion gas. The gas flow velocity at the inlet end of each catalyst unit 8 was 6 m/sec.

Figure 36:
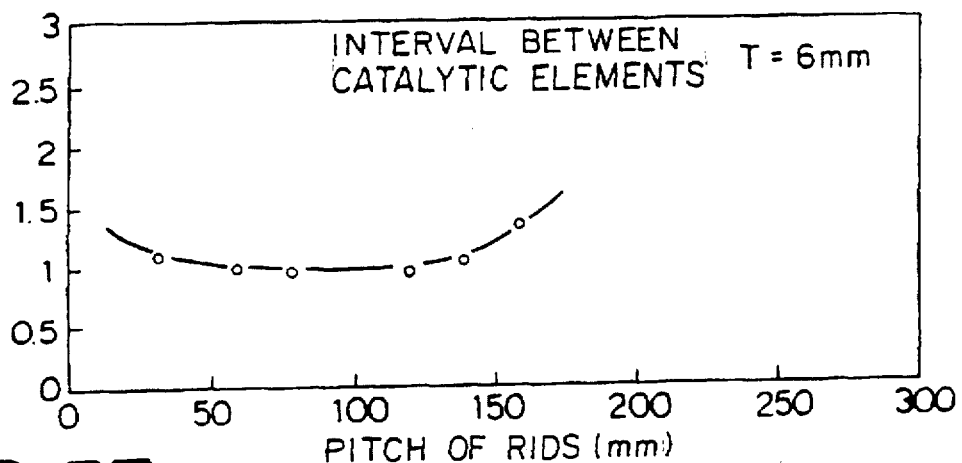
FIG. 36 is a graph showing the relation between the pitch of the ribs of a catalyst element and pressure loss.

The length L of the catalyst elements of the catalyst unit 8 in which the pitch $L_3$ of the ribs are 60 mm was 500 mm. The lengths of the catalyst elements of the other catalyst units 8 in which the pitches $L_3$ of the ribs are those other than 60 mm were determined so that the catalytic activities of those catalyst units 8 are equal to the catalyst unit 8 in which the pitch $L_3$ of the ribs is 60 mm. FIG. 36 shows normalized pressure losses caused by the catalyst units 8 normalized by a pressure loss caused by the catalyst unit 8 in which the pitch $L_3$ of the ribs is 60 mm.

Experiment 2

Figure 37:
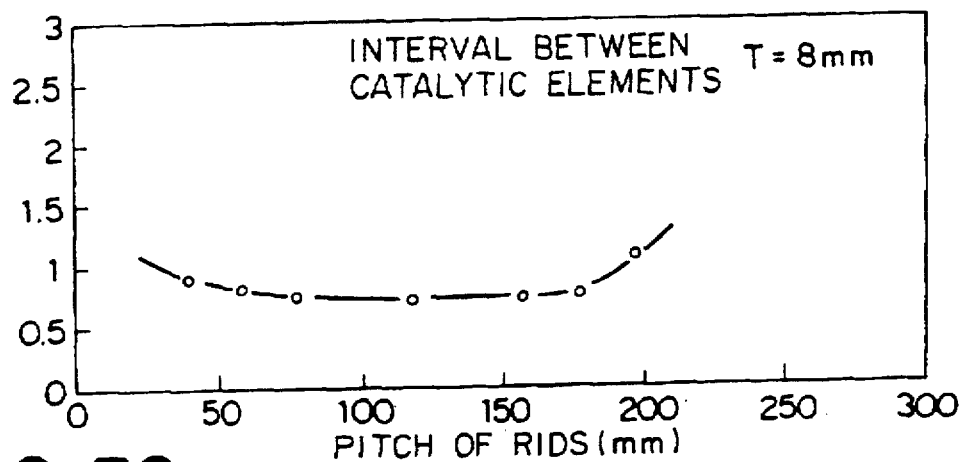
FIG. 37 is a graph showing the relation between the pitch of the ribs of a catalyst element and pressure loss.

Experiments similar to those in Experiment 1 was conducted. Catalyst units 8 were constructed by stacking eighteen catalyst elements 1 including those having ribs 2 of a height $h_1=3$ mm extended in parallel to the direction of the gas flow 6 and those having ribs 2 of a height $h_1=5$ mm extended perpendicular to the direction of the gas flow 6, at equal intervals T=8 mm. In the catalyst units 8, the pitches $L_3$ of the ribs were 40, 60, 80, 120, 180 and 200 mm, respectively; that is, the pitches $L_3$ were about five to twenty-five times the interval T between the adjacent catalyst elements 1, respectively. FIG. 37 shows the results of experiments similar to those in Experiment 1.

Experiment 3

Figure 38:
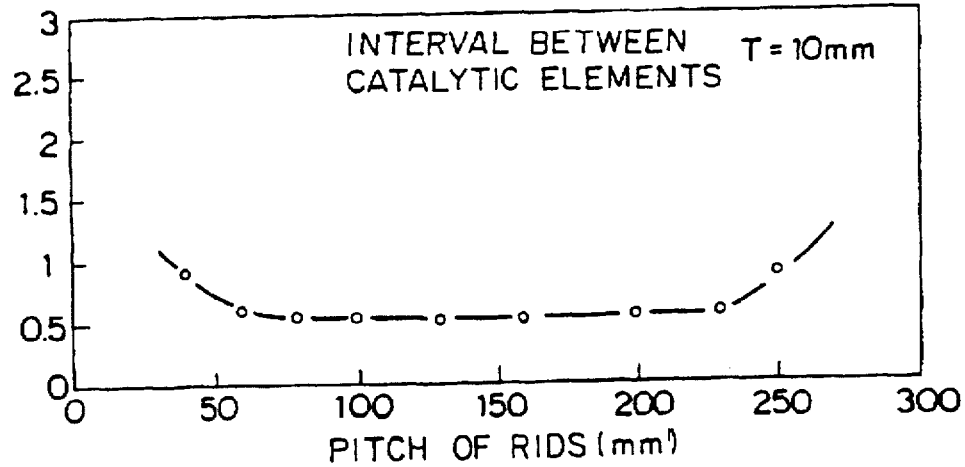
FIG. 38 is a graph showing the relation between the pitch of the ribs of a catalyst element and pressure loss.

Experiments similar to those in Experiment 1 were conducted. Catalyst units 8 were constructed by stacking fifteen catalyst elements 1 including those having ribs 2 of a height $h_1=3$ mm extended in parallel to the direction of the gas flow 6 and those having ribs 2 of a height $h_1=7$ mm extended perpendicular to the direction of the gas flow 6, at equal intervals T =10 mm. In the catalyst units 8, the pitches $L_3$ of the ribs were 60, 80, 100, 130, 160, 200, 230 and 250 mm, respectively; that is, the pitches $L_3$ were about six to twenty-five times the interval T between the adjacent catalyst elements 1, respectively. FIG. 38 shows the results of experiments similar to those in Experiment 1.

All the curves in FIGS. 36, 37 and 38 are downward convex. The pressure loss is on the lowest level when the pitch $L_3$ of the ribs 2 is in the range of 60 to 140 mm in Experiment 1, in the range of 80 to 180 mm in Experiment 2 and in the range of 100 to 230 mm in Experiment 3. It was found that the pressure loss can be reduced to the lowest possible extent when the pitch $L_3$ of the ribs 2 is in the range of ten to twenty-three times the interval T between the catalyst elements 1 when the amounts of the catalyst (lengths=depth of catalyst unit) are equivalent to the same catalytic activity.

The following facts were found from Examples 17-1 to 17-3 and 18-1 to 18-3 and the results of Experiments 1 to 3.

Figure 32:
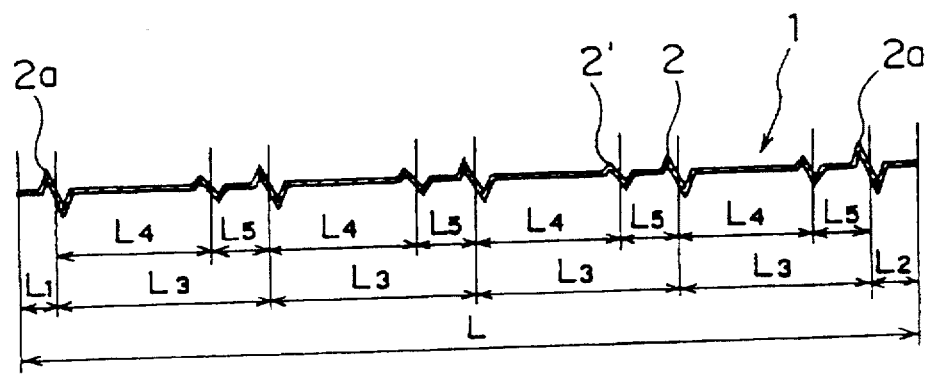
FIG. 32 is a side view of a catalyst element employed in Examples 17-1 to 18-3 and the like of the present invention.

For example, in the catalyst unit in Example 17-1, when the height $h_1$ of the ribs 2 of the catalyst elements 1 disposed with the ribs 2 extended perpendicular to the direction of the gas flow 6 is changed, namely a catalyst unit 8 as shown in FIG. 27 (the height of the ribs 2 of the catalyst elements 1' parallel to the direction of the gas flow 6 is equal to the height of the ribs 2 of the catalyst elements 1) is constructed of catalyst elements 1 having two types of ribs 2 and 2', i.e., higher ribs 2 and lower ribs 2', in an alternate arrangement, and the distances $L_1$ and $L_2$ from the opposite ends of each catalyst element to the ribs 2 being eight times the interval T (FIG. 27) between the adjacent catalyst elements 1 or above, and the pitches $L_4$ and $L_5$ of the ribs 2 being in the range of ten to twenty-three times the interval T between the catalyst elements 1 as shown in FIG. 32, the end portions of the catalyst elements of the catalyst unit will not bend and hence pressure loss can be suppressed to a low level.

The following experiments were conducted to compare the catalytic performance of the catalyst unit of the present invention and that of the prior art catalyst unit.

(1) A catalyst unit (I) similar to that of the catalyst unit in Example 1 of a stacking system shown in FIG. 6(a) was constructed by stacking catalyst elements 1 having flat sections 3 of 80 mm in width and ribs 2 of 2.5 mm in height from the surface of the flat sections 3 so that the ribs 2 of the catalyst elements 1 are inclined at 45° to the direction of the gas flow 6.

(2) A catalyst unit (II) similar to that of the catalyst unit in Example 8 of a stacking system shown in FIG. 44 was constructed by stacking catalyst elements 1 having flat sections 3 of 80 mm in width, ribs 2 of 4 mm in height from the surface of the flat sections 3 and open meshes so that the inclination θ of the ribs 2 of the catalyst elements 1 to the direction of the gas flow 6 is 90°.

(3) A catalyst unit (III) similar to that of the catalyst unit in Comparative example 2 of a stacking system shown in FIG. 44 was constructed by stacking catalyst elements 1 having flat sections 3 of 80 mm in width, ribs 2 of 2.5 mm in height from the surface of the flat sections 3 and stopped up meshes so that the inclination θ of the ribs 2 of the catalyst elements 1 to the direction of the gas flow 6 is 90°.

Figure 47:
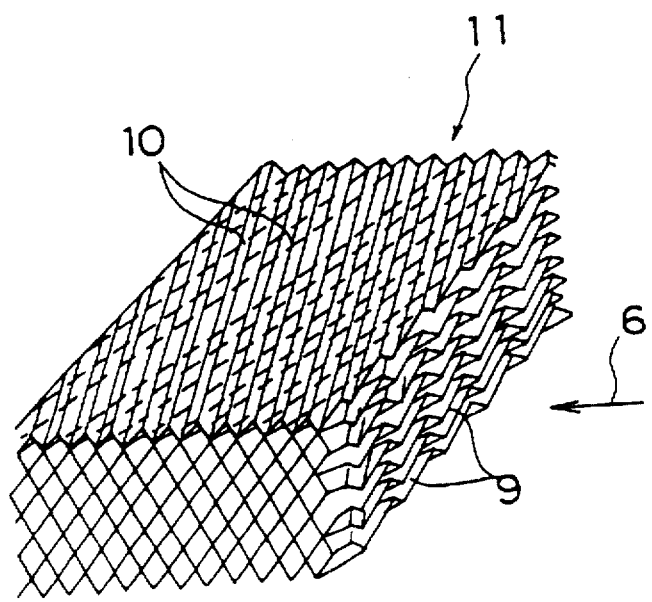
FIG. 47 is a perspective view of a catalyst unit constructed by staking catalyst elements like that shown in FIG. 46.
Figure 48:
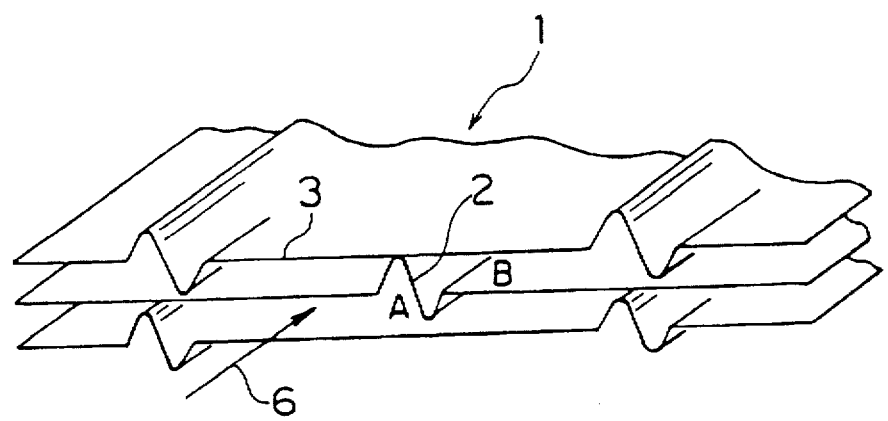
FIG. 48 is a fragmentary perspective view of a catalyst unit for assistance in explaining problems in the prior art.
Figure 49:
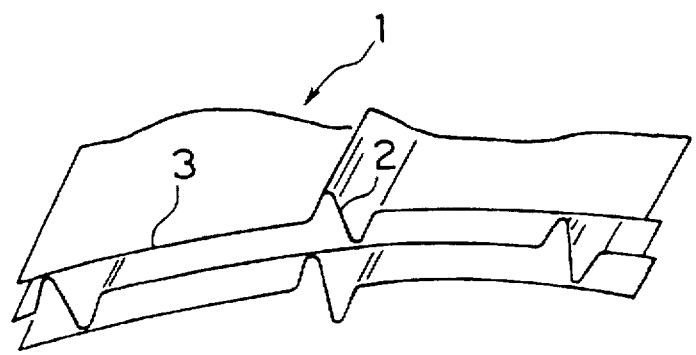
FIG. 49 is a fragmentary perspective view of a catalyst unit for assistance in explaining problems in the prior art.
Figure 50:
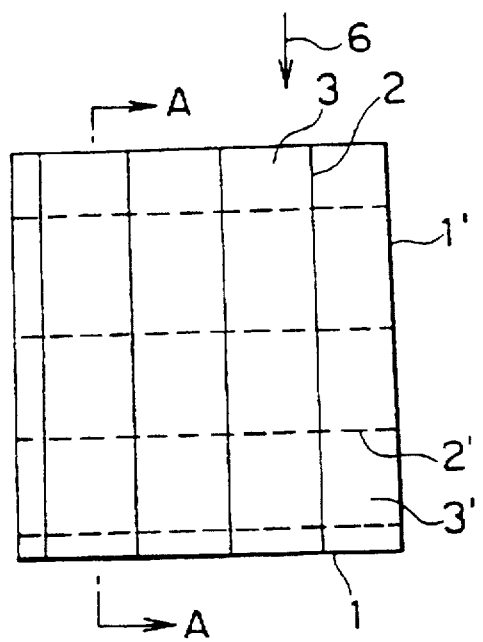
FIG. 50 is a view of assistance in explaining a mode of stacking prior art catalyst elements.
Figure 51:
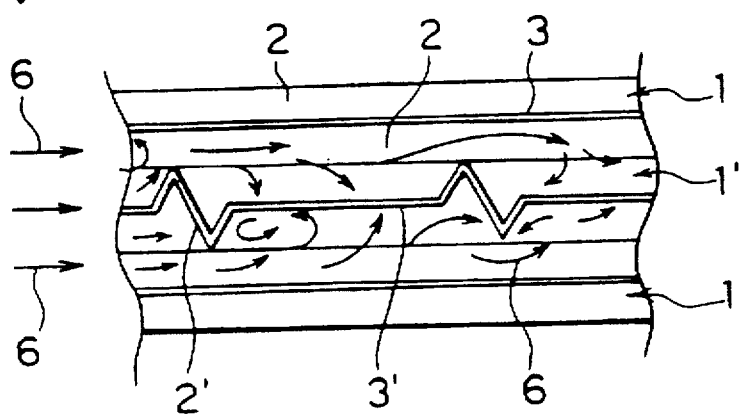
FIG. 51 is a typical view showing a gas flow in a catalyst unit constructed by stacking catalyst elements in the mode illustrated in FIG. 50.

(4) A catalyst unit (IV) was constructed by stacking the corrugated catalyst elements 10 shown in FIG. 47 having ridges 9 of 5 mm in height and coated with the same catalytic coating as that employed in (1) to (3) so that the respective ridges 9 of the adjacent catalyst elements 10 intersect each other perpendicularly and are inclined at 45° to the direction of the gas flow 6.

Figure 39:
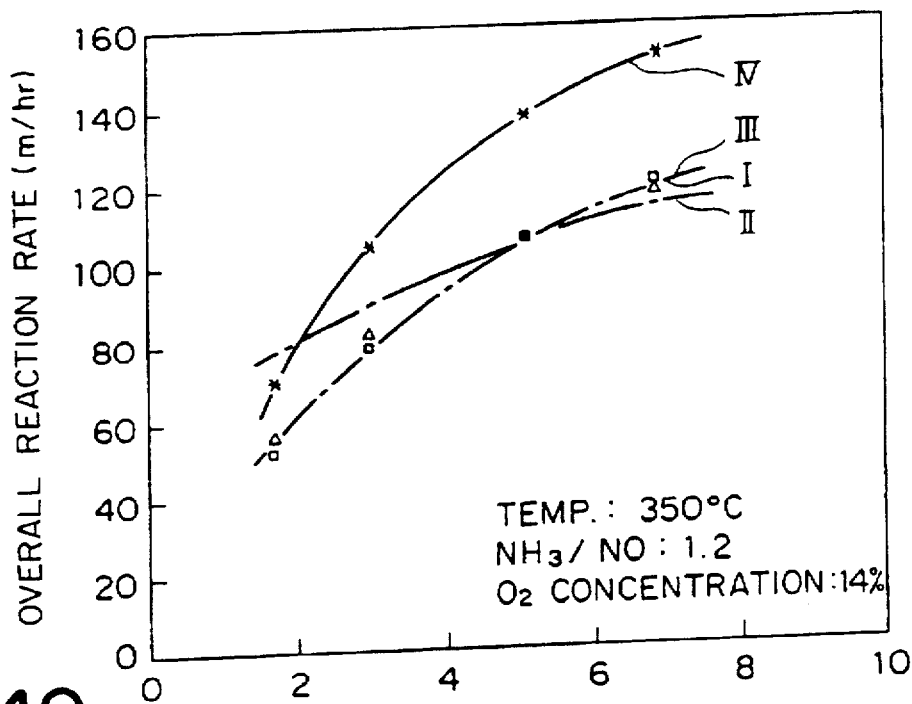
FIG. 39 is a graph showing the relation between overall reaction rate and gas flow velocity for catalyst units in Examples 1 and 8 of the present invention and Comparative example 2 and a catalyst unit 11 shown in FIG. 47.
Figure 40:
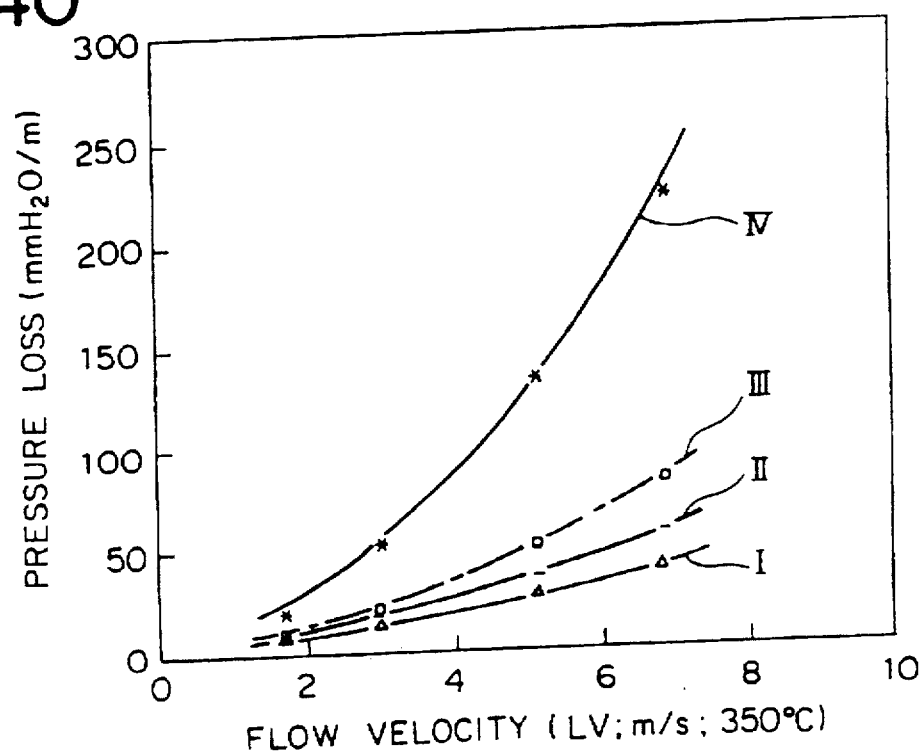
FIG. 40 is a graph comparatively showing the relation between pressure loss and gas flow velocity for the catalyst units in Examples 1 and 8 of the present invention and Comparative example 2 and the catalyst unit 11 shown in FIG. 47.
Figure 41:
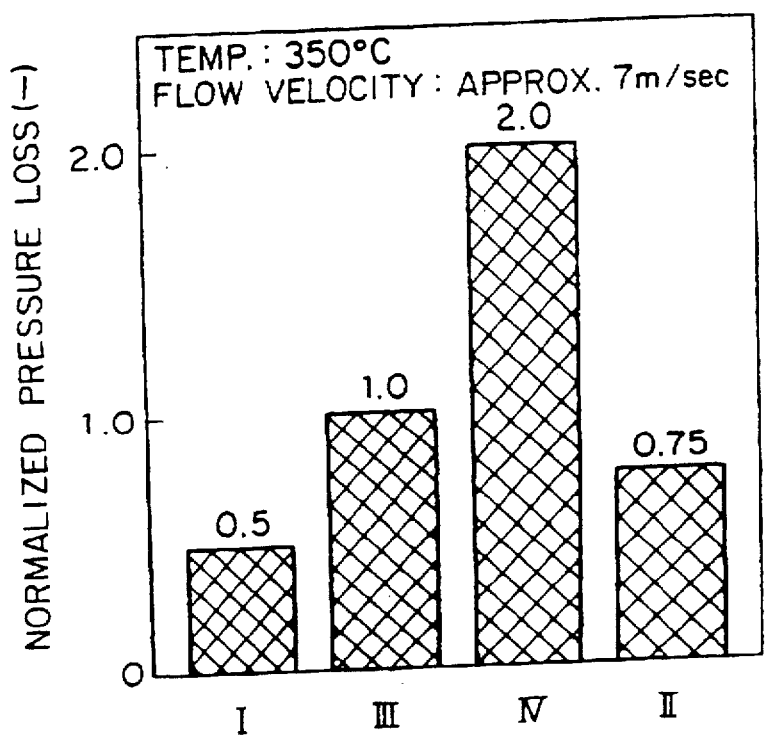
FIG. 41 is a diagram comparatively showing data representing pressure loss caused by the catalyst units in Examples 1 and 8 of the present invention and Comparative example 2 and the catalyst unit 11 shown in FIG. 47 on the basis of the same denitrating ability.

An LPG combustion gas was passed through the catalyst units (I), (II), (III) and (IV) to examine the relation between overall reaction velocity constant and gas flow velocity and the relation between pressure loss and gas flow velocity. Results of the examination are shown in FIGS. 39 and 40. FIG. 41 shows normalized pressure losses caused by the catalyst units (I), (II), (III) and (IV), respectively, for the same denitrating ability.

As is obvious from FIGS. 39, 40 and 41, the pressure losses caused by the catalyst units in accordance with the present invention are very small as compared with that caused by the catalyst unit (IV) shown in FIG. 47 for the same denitrating ability. The difference in pressure loss (about 130 mmH$_2$O) between the catalyst unit in Example 1 (catalyst unit I) and the catalyst unit shown in FIG. 47 (catalyst unit IV) for the same denitrating ability is equivalent to a power cost difference of $240,000 for annual power generation of 73,000 kW.

CAPABILITY OF EXPLOITATION IN INDUSTRY

The catalyst unit in accordance with the present invention exerts a low draft resistance, disturbs the gas flow to improve catalytic ability and has a compact construction. The catalyst unit in accordance with the present invention is applicable to various catalytic gas processing apparatuses, such as deodorizing apparatuses, catalytic combustors and fuel reformers. The use of the catalyst unit of the present invention in exhaust gas denitrating apparatuses for denitrating an exhaust gas by reducing the NOx contained in the exhaust gas under the existence of an ammonia reducer is the most typical application of the present invention.

We claim:

1. A catalyst unit comprising:
   a housing having an inlet and an outlet defining an axial direction therebetween and side walls;
   a plurality of first catalyst plate elements mounted within said housing between said inlet and said outlet, each first catalyst plate element supporting a catalytic material and having parallel first ribs spaced across one dimension thereof with flat sections separating the first ribs, said first ribs arranged at a first angle with said axial direction;
   a plurality of second catalyst plate elements mounted within said housing alternating with said first catalyst plate elements to form a stack, each second catalyst plate element supporting a catalytic material and having parallel second ribs spaced across one dimension thereof with flat sections separating the second ribs, said second ribs arranged at a second angle, different from said first angle, with said axial direction;
   wherein said flat sections define opposing surfaces for each of said catalyst plate elements and wherein each of said catalyst plate elements has ridges formed by said ribs and extending from both of its opposing surfaces, whereby contact between adjacent catalyst plate elements in said stack is point contact between their respective ribs; and wherein at least one of said first and second angles is greater than 0° and smaller than 90°.

2. A catalyst unit according to claim 1 wherein said one angle is in the range of 40° to an angle below 80°.

3. A catalyst unit according to claim 1, wherein said first and second catalyst plate elements are identical but are arranged with the opposing sides of said second catalyst plate elements reversed relative to the opposing sides of said first catalyst plate elements.

4. A catalyst unit according to claim 1, wherein said first angle is 0° so that said first ribs extend in parallel to said axial direction and to the direction of the gas flow, and said second angle is greater than 0° and smaller than 90°.

5. A catalyst unit according to claim 3 further comprising:

a plurality of third catalyst plate elements having third ribs arranged parallel to the axial direction and to the direction of the gas flow, said third catalyst plate elements being interposed between adjacent first and second catalyst plate elements; and a plurality of fourth catalyst plate elements which are identical to and reversed relative to said third catalyst plate elements and alternately arranged in said stack in contact with either the first or the second catalyst plate elements.

6. A catalyst unit according to claim 1, wherein said one angle is greater than 30° and smaller than 60°.

7. A catalyst unit according to claim 1, wherein each of said catalyst plate elements has two types of ribs of different heights.

8. A catalyst unit according to claim 1, wherein said first catalyst plate elements each have two types of ribs of different heights, and said second catalyst plate elements have ribs of the same height.

9. A catalyst unit according to claim 1, wherein said first ribs form ridges extending further from said opposing surfaces than ridges formed by said second ribs.

10. A catalyst unit according to claim 1, wherein said ribs have a cross-section of an S-curved shape, a zigzag shape or a convex relief shape.

11. A catalyst unit according to claim 1, wherein said catalytic material supported on said first and second catalyst plate elements is a denitrating catalyst.

12. A catalyst unit according to claim 1 wherein each catalyst plate element has one rib longer than its other ribs, and wherein said one longer rib has opposing ends in contact with side walls near the inlet and the outlet of said housing, respectively.

13. A catalyst unit according to claim 1, wherein the catalyst plate elements of at least one of said pluralities are perforated.

14. A catalyst unit according to claim 13, wherein the perforated plates have holes in their flat sections which are closed with the catalytic material and holes in their ribs which are open.

15. A catalyst unit according to claim 13, wherein the perforated plates have holes in their flat sections which are open and holes in their ribs which are closed with the catalytic material.

16. A catalyst unit according to claim 13 wherein the catalyst plate elements are arranged in said stack with ribs of adjacent catalyst plate elements perpendicular to each other.

17. A catalyst unit according to claim 13, wherein said first and second catalyst plate elements are identical but are arranged with the opposing sides of said second catalyst plate elements reversed relative to the opposing sides of said first catalyst plate elements.

18. A catalyst unit comprising:

a housing having an inlet and an outlet defining an axial direction therebetween and side walls;

a plurality of first perforated catalyst plate elements mounted within said housing between said inlet and said outlet, each first catalyst plate element supporting a catalytic material and having parallel first ribs spaced across one dimension thereof with flat sections separating the first ribs, said first ribs arranged at a first angle with said axial direction, said first perforated plates having holes of which at least a portion are open;

a plurality of second perforated catalyst plate elements mounted within said housing alternating with said first perforated catalyst plate elements to form a stack, each second perforated catalyst plate element supporting a catalytic material and having parallel second ribs spaced across one dimension thereof with flat sections separating the second ribs, said second ribs arranged at a second angle, different from said first angle, with said axial direction, said second perforated catalyst plate elements having holes which are all closed by said catalytic material;

wherein said flat sections define opposing surfaces for each of said perforated catalyst plate elements and wherein each of said perforated catalyst plate elements has ridges formed by said ribs and extending from both of its opposing surfaces, whereby contact between adjacent perforated catalyst plate elements in said stack is point contact between their respective ribs; and wherein at least one of said first and second angles is greater 0° and smaller than 90°.

19. A catalyst unit according to claim 18, wherein said first perforated catalyst plate elements have holes in their flat sections all of which are closed with the catalytic material and holes in their ribs all of which are open.

20. A catalyst unit according to claim 18, wherein said first perforated catalyst plate elements have holes in their flat sections all of which are open and holes in their ribs all of which are closed with the catalytic material.

21. A catalyst unit according to claim 18, wherein said first and second perforated catalyst plate elements are alternatively arranged with their respective ribs perpendicular to each other.

22. A catalyst unit according to claim 18, wherein said first and second perforated catalyst plate elements are identical but are arranged with the opposing sides of said second perforated catalyst plate elements reversed relative to the opposing sides of said first perforated catalyst plate elements.

23. A catalyst unit according to claim 18, wherein each of said perforated catalyst plate elements has two types of ribs of different heights.

24. A catalyst unit according to claim 18, wherein said first perforated catalyst plate elements each have two types of ribs of different heights, and said second perforated catalyst plate elements have ribs of the same height.

25. A catalyst unit according to claim 18, wherein said first ribs form ridges extending further from said opposing surfaces than ridges formed by said second ribs.

26. A catalyst according to claim 18, wherein said ribs have a cross-section of an S-curved shape, a zigzag shape or a convex relief shape.

27. A catalyst unit according to claim 18, wherein said perforated catalyst plate elements are metal laths.

28. A catalyst unit according to claim 1 wherein said perforated catalyst plate elements are arranged in said stack with ribs of adjacent catalyst plate elements perpendicular to each other.

29. A catalyst unit according to claim 18 wherein the ribs of each of said perforated catalyst plate elements are evenly spaced by a distance ten to twenty-three times an interval between adjacent perforated catalyst plate elements in said stack.

* * * * *